(12) United States Patent
Watanabe et al.

(10) Patent No.: US 11,436,769 B2
(45) Date of Patent: Sep. 6, 2022

(54) VISUALIZED DATA GENERATION DEVICE, VISUALIZED DATA GENERATION SYSTEM, AND VISUALIZED DATA GENERATION METHOD

(71) Applicant: Kabushiki Kaisha Toshiba, Tokyo (JP)

(72) Inventors: Wataru Watanabe, Koto (JP); Jumpei Ando, Yokohama (JP); Takayuki Itoh, Kawasaki (JP); Toshiyuki Ono, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 17/010,903

(22) Filed: Sep. 3, 2020

(65) Prior Publication Data

US 2021/0134032 A1 May 6, 2021

(30) Foreign Application Priority Data

Oct. 30, 2019 (JP) .............................. JP2019-197855

(51) Int. Cl.
*G06T 11/20* (2006.01)
*G06T 11/60* (2006.01)
*G06T 7/00* (2017.01)

(52) U.S. Cl.
CPC .......... *G06T 11/206* (2013.01); *G06T 7/0004* (2013.01); *G06T 11/60* (2013.01); *G06T 2207/30164* (2013.01)

(58) Field of Classification Search
CPC ................ G06T 7/0004; G06T 11/206; G05B 2219/32222
See application file for complete search history.

(56) References Cited

U.S. PATENT DOCUMENTS 6,777,677 B2 * 8/2004 Nozoe .................... G01N 23/20
250/307
8,395,766 B2 * 3/2013 Imai ....................... G01N 21/94
356/237.3

(Continued)

FOREIGN PATENT DOCUMENTS

JP 4368905 B2 11/2009
JP 4413673 B2 2/2010

(Continued)

*Primary Examiner* — David T Welch
(74) *Attorney, Agent, or Firm* — Oblon, McClelland, Maier & Neustadt, L.L.P.

(57) ABSTRACT

A visualized data generation device includes an acquisitor, an analyzer, and a generator. The acquisitor acquires manufacturing data including one or more pieces of first data Yi regarding a product state with respect to one product. The analyzer analyzes the first data Yi acquired by the acquisitor and derives a first index value with respect to each piece of the first data Yi. The generator generates visualized data including a first analysis result display region for causing a display device to display information about the first index value. The generator generates the visualized data in which an amount of information and a priority is set for each first analysis result display region on the basis of the first index value and a display form of the first analysis result display region is set on the basis of the amount of information and the priority.

18 Claims, 29 Drawing Sheets

(56) References Cited

U.S. PATENT DOCUMENTS

| | | | | |
|---|---|---|---|---|
| 8,891,852 | B2* | 11/2014 | Eames | G06K 9/00624 |
| | | | | 382/141 |
| 9,824,453 | B1* | 11/2017 | Collins | G06Q 40/08 |
| 10,901,405 | B2* | 1/2021 | Kawano | G05B 19/406 |
| 2003/0028418 | A1* | 2/2003 | Yamaguchi | G06Q 10/06 |
| | | | | 702/81 |
| 2005/0251365 | A1 | 11/2005 | Matsushita et al. | |
| 2008/0219544 | A1 | 9/2008 | Tasaki et al. | |
| 2008/0278495 | A1 | 11/2008 | Minamide et al. | |
| 2010/0162029 | A1* | 6/2010 | Powell | G06Q 50/04 |
| | | | | 714/2 |
| 2011/0307090 | A1* | 12/2011 | Hamazoe | G06F 30/17 |
| | | | | 700/104 |
| 2013/0322710 | A1* | 12/2013 | Notte | G06T 7/11 |
| | | | | 382/128 |
| 2016/0342392 | A1 | 11/2016 | Tasaki | |
| 2017/0261403 | A1* | 9/2017 | Hiruta | G01M 15/14 |
| 2019/0082059 | A1* | 3/2019 | Hirata | H04N 1/00042 |
| 2019/0333165 | A1* | 10/2019 | Lyle | G06Q 50/04 |
| 2020/0134384 | A1* | 4/2020 | Hino | G06K 9/6271 |
| 2020/0241949 | A1* | 7/2020 | Basu | G06F 11/079 |
| 2021/0209422 | A1* | 7/2021 | Horita | G06V 10/25 |
| 2022/0068440 | A1* | 3/2022 | Mrziglod | G16C 20/10 |

FOREIGN PATENT DOCUMENTS

| | | |
|---|---|---|
| JP | 5014500 B1 | 8/2012 |
| JP | 5186956 B2 | 4/2013 |
| JP | 5866446 B2 | 2/2016 |
| WO | WO 2015/118946 A1 | 8/2015 |
| WO | 2021/015093 A1 | 1/2021 |

\* cited by examiner

FIG. 2

| ID | C_1 | C_2 | C_3 | ... | C_M-1 | C_M | Y_1 | Y_2 | Y_3 | ... | Y_N-1 | Y_N |
|---|---|---|---|---|---|---|---|---|---|---|---|---|
| XXXX-00001 | A | 6 | 0.98 | ... | 6 | A-1 | 0.21 | 0.54 | 0.34 | ... | 0.66 | 0.68 |
| XXXX-00002 | A | 1 | 0.42 | ... | 5 | A-2 | 0.03 | 0.66 | 0.73 | ... | 0.42 | 0.19 |
| XXXX-00003 | B | 2 | 0.09 | ... | 5 | A-3 | 0.99 | 0.21 | 0.97 | ... | 0.34 | 0.83 |
| XXXX-00004 | B | 3 | 0.38 | ... | 4 | A-4 | 0.13 | 0.82 | 0.02 | ... | 0.38 | 0.41 |
| XXXX-00005 | A | 3 | 0.57 | ... | 3 | A-5 | 0.17 | 0.71 | 0.48 | ... | 0.21 | 0.07 |
| XXXX-00006 | A | 2 | 0.02 | ... | 3 | A-6 | 0.98 | 0.29 | 0.71 | ... | 0.16 | 0.09 |
| ... | ... | ... | ... | ... | ... | ... | ... | ... | ... | ... | ... | ... |
| XXXX-00011 | B | 3 | 0.29 | ... | 3 | A-1 | 0.84 | 0.68 | 0.68 | ... | 0.67 | 0.57 |
| XXXX-00012 | A | 5 | 0.13 | ... | 3 | A-2 | 0.21 | 0.02 | 0.75 | ... | 0.79 | 0.34 |
| XXXX-00013 | A | 2 | 0.61 | ... | 2 | A-3 | 0.59 | 0.98 | 0.32 | ... | 0.49 | 0.64 |
| XXXX-00014 | B | 3 | 0.01 | ... | 3 | A-4 | 0.80 | 0.42 | 0.81 | ... | 0.50 | 0.30 |
| XXXX-00015 | A | 3 | 0.24 | ... | 1 | A-5 | 0.57 | 0.73 | 0.29 | ... | 0.96 | 0.13 |
| XXXX-00016 | B | 4 | 0.51 | ... | 1 | A-6 | 0.49 | 0.80 | 0.02 | ... | 0.00 | 0.99 |

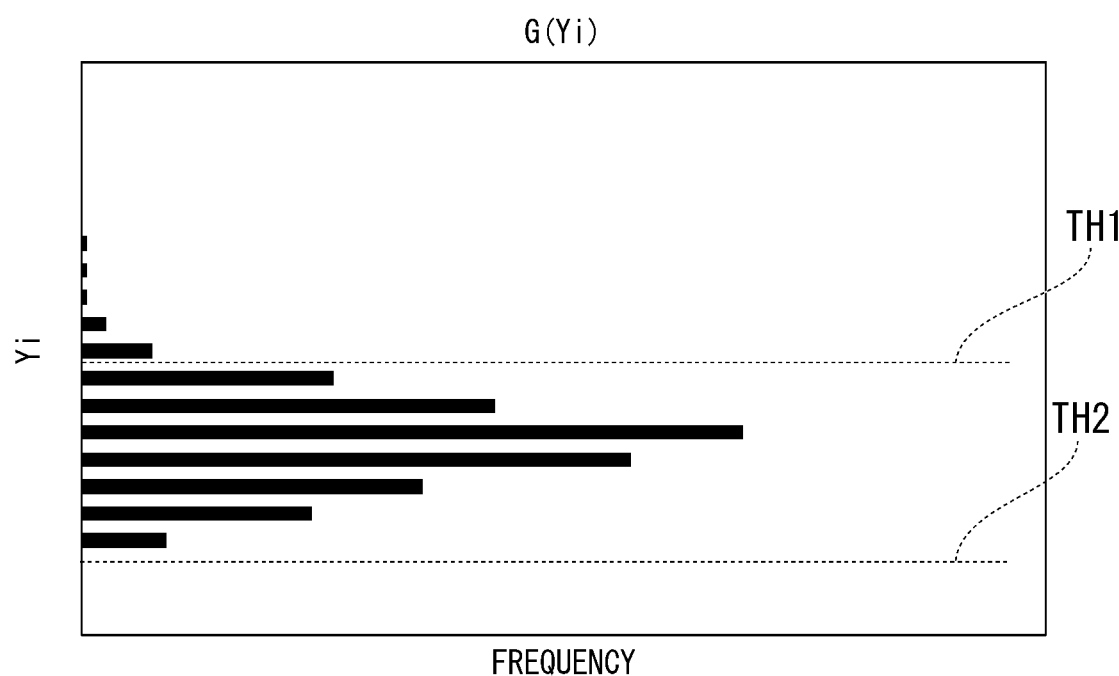

G(Yi, Cj)

| C_j | NUMBER OF PRODUCTS FOR WHICH Yi IS DETERMINED TO BE ABNORMAL | NUMBER OF PRODUCTS PER DEVICE |
|---|---|---|
| DEVICE A | 20 | 1000 |
| DEVICE B | 20 | 1000 |
| DEVICE C | 20 | 1000 |

G(Yi, Cj)

| C_j | NUMBER OF PRODUCTS FOR WHICH Yi IS DETERMINED TO BE ABNORMAL | NUMBER OF PRODUCTS PER DEVICE |
|---|---|---|
| DEVICE A | 3 | 1000 |
| DEVICE B | 50 | 1000 |
| DEVICE C | 7 | 1000 |

FIG. 29

| ID | PROCESS A | | PROCESS B | ... | PROCESS G | | PROCESS H | | | ... | PROCESS L | |
|---|---|---|---|---|---|---|---|---|---|---|---|---|
| | C_1 | C_2 | C_3 | ... | C_M-1 | C_M | Y_1 | Y_2 | Y_3 | ... | Y_N-1 | Y_N |
| XXXX-00001 | A | 6 | 0.98 | ... | 6 | A-1 | 0.21 | 0.54 | 0.34 | ... | 0.66 | 0.68 |
| XXXX-00002 | A | 1 | 0.42 | ... | 5 | A-2 | 0.03 | 0.66 | 0.73 | ... | 0.42 | 0.19 |
| XXXX-00003 | B | 2 | 0.09 | ... | 5 | A-3 | 0.99 | 0.21 | 0.97 | ... | 0.34 | 0.83 |
| XXXX-00004 | B | 3 | 0.38 | ... | 4 | A-4 | 0.13 | 0.82 | 0.02 | ... | 0.38 | 0.41 |
| XXXX-00005 | A | 3 | 0.57 | ... | 3 | A-5 | 0.17 | 0.71 | 0.48 | ... | 0.21 | 0.07 |
| XXXX-00006 | A | 2 | 0.02 | ... | 3 | A-6 | 0.98 | 0.29 | 0.71 | ... | 0.16 | 0.09 |
| ... | ... | ... | ... | ... | ... | ... | ... | ... | ... | ... | ... | ... |
| XXXX-00011 | B | 3 | 0.29 | ... | 3 | A-1 | 0.84 | 0.68 | 0.68 | ... | 0.67 | 0.57 |
| XXXX-00012 | A | 5 | 0.13 | ... | 3 | A-2 | 0.21 | 0.02 | 0.75 | ... | 0.79 | 0.34 |
| XXXX-00013 | A | 2 | 0.61 | ... | 2 | A-3 | 0.59 | 0.98 | 0.32 | ... | 0.49 | 0.64 |
| XXXX-00014 | B | 3 | 0.01 | ... | 3 | A-4 | 0.80 | 0.42 | 0.81 | ... | 0.50 | 0.30 |
| XXXX-00015 | A | 3 | 0.24 | ... | 1 | A-5 | 0.57 | 0.73 | 0.29 | ... | 0.96 | 0.13 |
| XXXX-00016 | B | 4 | 0.51 | ... | 1 | A-6 | 0.49 | 0.80 | 0.02 | ... | 0.00 | 0.99 |

FIG. 30

| | PROCESS A | PROCESS B | ... | PROCESS G | PROCESS H | PROCESS I | ... | PROCESS L |
|---|---|---|---|---|---|---|---|---|
| USER 1 | ○ | ○ | ... | ○ | ○ | - | ... | - |
| USER 2 | - | - | ... | ○ | - | - | ... | ○ |
| USER 3 | ○ | ○ | ... | - | ○ | ○ | ... | ○ |

| DISPLAY LEVEL | 1 | 2 | ... | 3 | 1 | 2 | ... | 3 |

| ID | C_1 | C_2 | C_3 | ... | C_M-1 | C_M | Y_1 | Y_2 | Y_3 | ... | Y_N-1 | Y_N |
|---|---|---|---|---|---|---|---|---|---|---|---|---|
| XXXX-00001 | A | 6 | 0.98 | ... | 6 | A-1 | 0.21 | 0.54 | 0.34 | ... | 0.66 | 0.68 |
| XXXX-00002 | A | 1 | 0.42 | ... | 5 | A-2 | 0.03 | 0.66 | 0.73 | ... | 0.42 | 0.19 |
| XXXX-00003 | B | 2 | 0.09 | ... | 5 | A-3 | 0.99 | 0.21 | 0.97 | ... | 0.34 | 0.83 |
| XXXX-00004 | B | 3 | 0.38 | ... | 4 | A-4 | 0.13 | 0.82 | 0.02 | ... | 0.38 | 0.41 |
| XXXX-00005 | A | 3 | 0.57 | ... | 3 | A-5 | 0.17 | 0.71 | 0.48 | ... | 0.21 | 0.07 |
| XXXX-00006 | A | 2 | 0.02 | ... | 3 | A-6 | 0.98 | 0.29 | 0.71 | ... | 0.16 | 0.09 |
| ... | ... | ... | ... | ... | ... | ... | ... | ... | ... | ... | ... | ... |
| XXXX-00011 | B | 3 | 0.29 | ... | 3 | A-1 | 0.84 | 0.68 | 0.68 | ... | 0.67 | 0.57 |
| XXXX-00012 | A | 5 | 0.13 | ... | 3 | A-2 | 0.21 | 0.02 | 0.75 | ... | 0.79 | 0.34 |
| XXXX-00013 | A | 2 | 0.61 | ... | 2 | A-3 | 0.59 | 0.98 | 0.32 | ... | 0.49 | 0.64 |
| XXXX-00014 | B | 3 | 0.01 | ... | 3 | A-4 | 0.80 | 0.42 | 0.81 | ... | 0.50 | 0.30 |
| XXXX-00015 | A | 3 | 0.24 | ... | 1 | A-5 | 0.57 | 0.73 | 0.29 | ... | 0.96 | 0.13 |
| XXXX-00016 | B | 4 | 0.51 | ... | 1 | A-6 | 0.49 | 0.80 | 0.02 | ... | 0.00 | 0.99 |

VISUALIZED DATA GENERATION DEVICE, VISUALIZED DATA GENERATION SYSTEM, AND VISUALIZED DATA GENERATION METHOD

BACKGROUND

Technical Field

Embodiments of the present invention generally relate to a visualized data generation device, a visualized data generation system, and a visualized data generation method.

Related Art

In manufacturing industries, it would have been important to detect abnormalities and the like in products at early stage and take countermeasure the abnormalities. A graph drawing device represents in a graph information about abnormalities of products. It is possible to easily detect an abnormality in a product and the like by looking at a graph displayed by the graph drawing device. As the number of items to be inspected for detecting abnormality in a product or the like will increase, the probability of overlooking the abnormality or the like would in general increase.

PATENT DOCUMENTS

[Patent Document 1] Japanese Patent No. 5866446

In some embodiments of the present invention, a visualized data generation device, a visualized data generation system, and a visualized data generation method are to avoiding overlooking of an abnormality in a product or the like.

SUMMARY

According to some embodiments, a visualized data generation device may include, but is not limited to, an acquisitor, an analyzer, and a generator. The acquisitor acquires manufacturing data including one or more pieces of first data $Y_i$ ($i=1, \ldots, N$ where N is an integer of 1 or more) regarding a product state with respect to one product. The analyzer analyzes the first data $Y_i$ acquired by the acquisitor and derives a first index value with respect to each piece of the first data $Y_i$. The generator generates visualized data including at least one first analysis result display region for causing a display device to display information about the first index value. The generator generates the visualized data in which at least one of an amount of information and a priority is set for each first analysis result display region on the basis of the first index value and a display form of the first analysis result display region or a display form of information included in the first analysis result display region is set on the basis of the at least one of the amount of information and the priority.

BRIEF DESCRIPTION OF THE DRAWINGS

FIG. 2 is a diagram showing an example of manufacturing data and manufacturing condition data acquired by an acquisitor.

FIG. 5 is a diagram showing an example of a histogram of the manufacturing data $Y_i$ that serves as the first analysis information $G(Y_i)$.

FIG. 6 is a diagram showing an example of numerical data representing the first analysis information $G(Y_i)$.

FIG. 29 is a diagram showing an example of manufacturing data including a manufacturing process and manufacturing condition data acquired by an acquisitor according to the fourth embodiment.

FIG. 30 is a diagram showing an example of manufacturing data including a manufacturing process and user information and manufacturing condition data acquired by the acquisitor according to the fourth embodiment.

DETAILED DESCRIPTION

Hereinafter, a visualized data generation device, a visualized data generation system, and a visualized data generation method according to embodiments will be described with reference to the drawings. Also, in the following description, the same reference signs are given to components having the same or similar functions. Redundant description of the components may be omitted. The term "based on XX" mentioned in the present application means "based on at least XX" and also includes a case based on another element in addition to XX. Also, the term "based on XX" is not limited to a case in which XX is directly used and includes a case based on calculation or processing performed on XX. "XX" is any element (for example, any information).

First Embodiment

Figure 1:
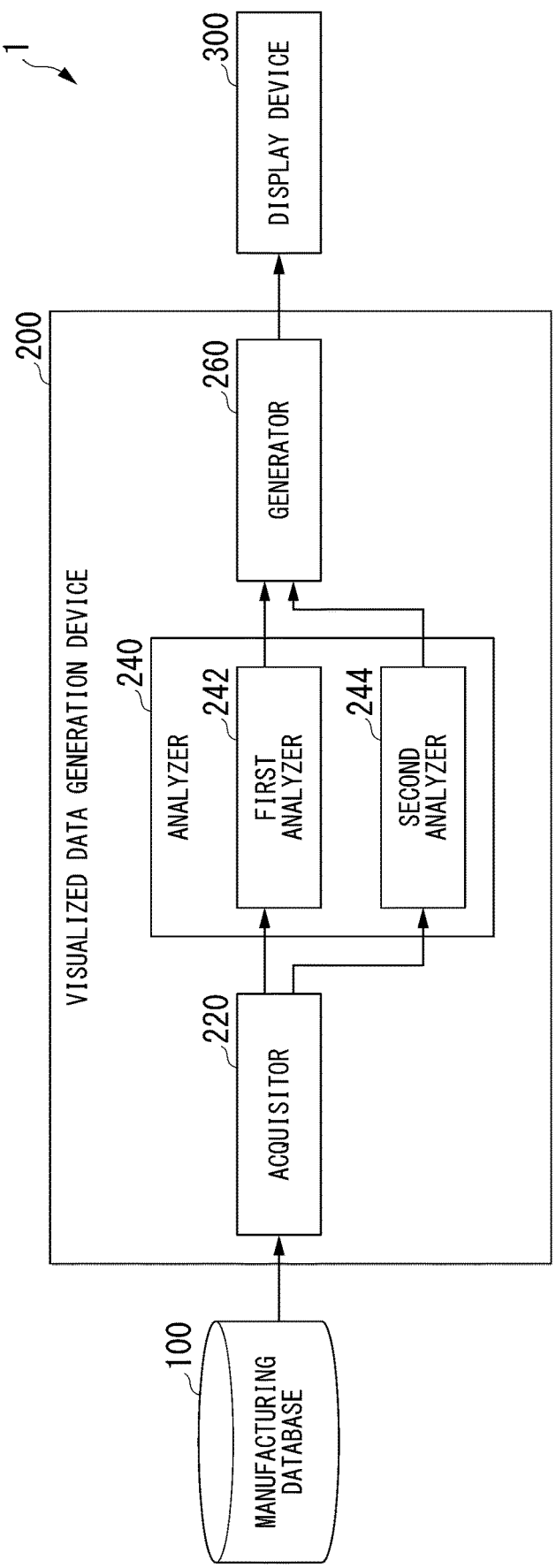
FIG. 1 is a block diagram showing a functional configuration of a visualized data generation system according to a first embodiment.

FIG. 1 is a block diagram showing a functional configuration of the visualized data generation system 1 according to a first embodiment. As shown in FIG. 1, the visualized data generation system 1 according to the first embodiment includes, for example, a manufacturing database 100, a visualized data generation device 200, and a display device 300. The visualized data generation system 1 performs quality management of products manufactured in a manufacturing factory and performs, for example, detection of abnormalities occurring in the products. The manufacturing factory includes, for example, a sensor that detects product states and provides the visualized data generation system 1 with manufacturing data regarding the product states and manufacturing condition data regarding product manufacturing conditions.

The product states are, for example, measured values regarding a product size (dimensions), electrical characteristics, physical characteristics, and the like and include a plurality of items. Some or all of the measured values of the product states are measured values regarding inspection items to be used to determine the shipment of products. Also, the product states are not limited to the measured values and may be a result of making any determination. For example, an integer value of five-level evaluation regarding the quality of a product, a binary flag obtained by determining the quality, or the like may be used. In addition, the product states may be those determined to be useful for analysis and visualization by a user. The manufacturing data is an example of first data.

The product manufacturing conditions include a plurality of items such as a name of a material used for the product and a name of a device used for processing and assembly. More generally, the product manufacturing conditions may be information about Man, Machine, Material, Method, Measurement, and Environment (5M1E) known as six primary factors for managing a manufacturing process. The product manufacturing conditions may be, for example, a processor name (Man), a device name, a manufacturing line name, and a device state (temperature, pressure, or the like) at the time of processing (Machine), an ID or a name of a material or component (Material), a processing method or a type of processing program (Method), a name of a device performing measurement or a measurement location (Measurement), and a building name, temperature, or humidity (Environment). For example, the product manufacturing conditions may be those determined to be useful for analysis and visualization by the user. The manufacturing condition data is an example of second data.

The manufacturing database 100 is, for example, a relational database management system (RDBMS) that stores manufacturing data and manufacturing condition data provided by a manufacturing factory. The manufacturing database 100 may be, for example, a NoSQL database or a file of a determined format such as csv. The manufacturing data stored in the manufacturing database 100 includes, for example, several thousand items or more. For example, the manufacturing data and the manufacturing condition data are stored using an ID for identifying each individual product as a key in the manufacturing database 100.

The manufacturing database 100 updates the stored database, for example, when manufacturing data and manufacturing condition data are provided by the manufacturing factory. The manufacturing database 100 outputs the manufacturing data and the manufacturing condition data included in the stored database to the visualized data generation device 200 in response to a request from the visualized data generation device 200.

The visualized data generation device 200 includes, for example, an acquisitor 220, an analyzer 240, and a generator 260. The visualized data generation device 200 is implemented by a hardware processor such as a central processing unit (CPU) executing a program (software). Also, some or all of these components may be implemented by hardware (a circuit including circuitry) such as a large-scale integration (LSI) circuit, an application specific integrated circuit (ASIC), a field-programmable gate array (FPGA), or a graphics processing unit (GPU) or may be implemented by software and hardware in cooperation. The program may be pre-stored in a storage device (a storage device including a non-transitory storage medium) such as a hard disk drive (HDD) or a flash memory of the visualized data generation device 200 or may be stored in a removable storage medium such as a DVD or a CD-ROM and installed in the HDD or the flash memory of the visualized data generation device 200 when the storage medium (a non-transitory storage medium) is mounted in a drive device.

In the visualized data generation device 200, the analyzer 240 analyzes data and derives index values of the manufacturing data and the manufacturing condition data after the acquisitor 220 acquires the manufacturing data and the manufacturing condition data. The generator determines an amount of information and a priority of an image showing results of analyzing the manufacturing data and the manufacturing condition data displayed on the display device 300 on the basis of the index values of the manufacturing data and the manufacturing condition data derived by the analyzer 240, generates visualized data according to the amount of information and the priority that have been determined, and outputs the generated visualized data to the display device 300.

The acquisitor 220 acquires the manufacturing data and the manufacturing condition data transmitted by the manufacturing database 100. FIG. 2 is a diagram showing an example of manufacturing data and manufacturing condition data acquired by the acquisitor 220. In FIG. 2, the vertical direction is referred to as a column and the horizontal direction is referred to as a row. The column direction represents items of manufacturing data and manufacturing condition data and the row direction represents manufacturing data and manufacturing condition data of each individual product. A column {Yi: i=1, . . . , N} represents data regarding product states. "N" in this data represents the number of items of the acquired manufacturing data. A column {Cj: j=1, . . . , M} represents data regarding the product manufacturing conditions. M in this data represents the number of items of the acquired manufacturing condition data.

The manufacturing data and the manufacturing condition data acquired by the acquisitor 220 have an ID for identifying each individual product as a key as in the case in which the data is stored in the manufacturing database 100. The key assigned to each individual is useful in identifying an abnormal product as a result of analysis or visualization. The key may be omitted if product identification is not required. If the manufacturing database is csv or the like and no special ID is recorded, it is only necessary to give a serial number or the like as a key.

The acquisitor 220 acquires one or more pieces (one or more rows) of manufacturing data and manufacturing condition data that satisfy the conditions. The condition here may be, for example, data included in the list when the IDs of the products to be analyzed and visualized are listed. In the data shown in FIG. 2, the number of pieces of acquired data (the number of rows thereof) is represented by D.

The condition of the data acquired by the acquisitor 220 may be, for example, a period. For example, the condition that the data is acquired (on products manufactured) during one hour or one day may be set to regularly monitor an abnormality in a product group manufactured during a period such as any one hour or any one day. When a time, a date, and the like when each product was processed or inspected are recorded in the manufacturing database, the data acquired by the acquisitor 220 may be product manufacturing data included in a period designated as one hour or one day. Also, a lot number, a lot ID, or the like may be pre-recorded as a number or a string representing a certain period or a unit of a certain number of products in the manufacturing database. In this case, the condition of the data acquired by the acquisitor 220 may be products of a designated lot number. In addition, the user may designate any condition to acquire product data.

The analyzer 240 includes, for example, a first analyzer 242 and a second analyzer 244. The first analyzer 242 analyzes manufacturing data within the manufacturing data and the manufacturing condition data acquired by the acquisitor 220 and outputs an index value of manufacturing data Yi and first analysis information about the manufacturing data Yi. Also, although a case in which the index value of the manufacturing data Yi is a numerical value representing a degree of abnormality of the manufacturing data Yi and the first analysis information is a numerical value or a chart regarding the degree of abnormality of the manufacturing data Yi will be described in the present embodiment, the scope of the present invention is not limited thereto. The second analyzer 244 analyzes the manufacturing data Yi and the manufacturing condition data Cj acquired by the acquisitor 220 and outputs an index value determined by the manufacturing data Yi and the manufacturing condition data Cj and second analysis information about the manufacturing data Yi and the manufacturing condition data Cj. Although the index value determined by the manufacturing data Yi and the manufacturing condition data Cj will be described as a numerical value indicating the causality of Cj for the abnormality of the manufacturing data Yi and the second analysis information will be described as a numerical value or a chart regarding the causality of the manufacturing condition data Cj for the abnormality of the manufacturing data Yi in the present embodiment, the scope of the present invention is not limited thereto. The first analysis information is an example of first analysis data and the second analysis information is an example of second analysis data.

Figure 3:
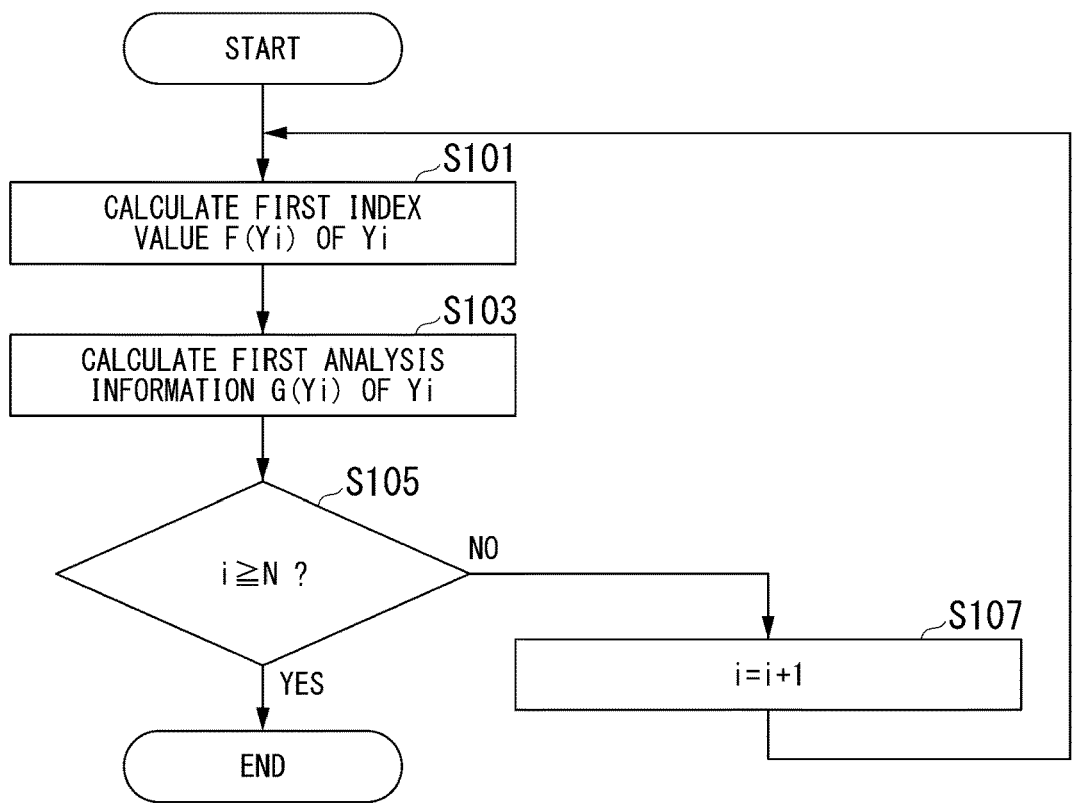
FIG. 3 is a flowchart showing an example of a process to be executed by a first analyzer.

First, a process to be executed by the first analyzer 242 will be described. FIG. 3 is a flowchart showing an example of the process to be executed by the first analyzer 242. As shown in FIG. 3, the first analyzer 242 first derives and calculates a first index value F(Yi) {i=1, . . . , N} for manufacturing data {Yi: i=1, . . . , N} (step S101). In the processing of the first step S101, a variable i=1.

Subsequently, the first analyzer 242 calculates first analysis information G(Yi)=1, . . . , N) indicating a result of analyzing the manufacturing data {Yi: i=1, . . . , N} (step S103). Subsequently, the first analyzer 242 determines whether or not a value of the variable i is N or more (i≥N) (step S105). When it is determined that the value of the variable i is not N or more (or is less than N), the first analyzer 242 increments the variable i (step S107) and returns to the processing of step S101. In this manner, when it is determined that the value of the variable i is greater than or equal to N (or is N) by executing the processing of steps S101 and S103 on all the manufacturing data Yi, the first analyzer 242 determines that the process shown in FIG. 3 ends.

The first index value F(Yi) in the first embodiment is an index representing the degree of abnormality of the manufacturing data Yi and represents a probability of occurrence of an abnormality or a magnitude of an abnormality. In the first embodiment, an abnormality rate=the number of products determined to be abnormal/the total number of products (D) is used as the first index value F(Yi).

The first analyzer 242 presets a threshold value for the value of the manufacturing data Yi as a reference for determining that the manufacturing data Yi is abnormal. The first analyzer 242 determines that the manufacturing data Yi, which exceeds the threshold value, is abnormal. The threshold value may be any value. For example, a standard value or a management reference value, which is often used in production management, or the like may be used as the threshold value. The standard value is a value determined for the product to be shipped and the management reference value is a value provided for production management to ensure the standard value. The user can easily understand the index value F(Yi) using the standard value or the management reference value as the threshold value.

The threshold value may be calculated on the basis of the value of the manufacturing data Yi instead of the preset value. For example, because D pieces of data are acquired in the present embodiment, the threshold value may be determined using at least some of D Yi values. The threshold value may be calculated by, for example, a well-known method using a standard deviation. In this case, for example, when an average and a standard deviation of the D pieces of manufacturing data Yi are calculated and each value of the manufacturing data Yi is outside a predetermined range of a standard deviation $\sigma$ using a standard deviation $\pm\sigma$ as the threshold value, an individual product may be determined to be abnormal. The threshold value may be, for example, $\pm 3\sigma$ or $\pm 4\sigma$, or the individual product may be determined to be abnormal when each value of the manufacturing data Yi is outside the range of $\pm 3\sigma$ or $\pm 4\sigma$. Although the positive and negative ranges are the same in this example, the positive and negative ranges may be different.

When an average $\mu$ and a standard deviation $\sigma$ of the manufacturing data Yi are calculated, an estimation method based on a least-squares method that is often used may be used. Also, the manufacturing data Yi often includes outliers. Thus, a robust estimation method for outliers based on a median and quartiles may be used instead of the estimation method based on the least-squares method. For example, the threshold value may be set using a median of measured values as an average $\mu$ of a normal distribution, or the standard deviation $\sigma=0.7413\times$IQR (interquartile range=distance between first quartile and third quartile).

Alternatively, the threshold value may be determined using a predetermined percentile point as a reference without using the standard deviation a. Also, as in a nearest neighbor method, the abnormality may be determined according to a reference based on a distance of values of the D pieces of the manufacturing data Yi instead of the threshold value. These schemes are basic outlier detection methods and any other existing outlier detection methods may be used. The distribution of the manufacturing data Yi may not follow the normal distribution according to characteristics of the manufacturing data. This case is useful for the method using the standard deviation a.

In the case of a scheme of calculating the threshold value on the basis of values of a plurality of pieces of manufacturing data Yi, there is a possibility that an abnormality caused within the standard value or the management reference value can be detected as compared with a scheme in which a specified value such as the standard value or the management reference value is used as the threshold value. Thus, it is possible to increase a possibility that an abnormality in the product will be detected at an earlier stage.

When the manufacturing data Yi is a result of making any determination instead of a numerical value, it is only necessary to provide a reference with respect to the determination result and use the reference as an index value. For example, when a binary flag for determining the quality of a product has been set, the number of products determined to be bad/the total number of products (D) may be set as the abnormality rate. Also, the index value is not limited to the abnormality rate and other indexes may be used. For example, a certain reference value may be set with respect to a statistic amount such as a magnitude of an average or a standard deviation of the manufacturing data Yi, a maximum value, or a minimum value and a difference from the reference value, a ratio related to the reference value, or the like may be used.

The first analyzer 242 may derive one (single) index value or two or more (a plurality of) index values. By deriving a plurality of index values, it is possible to multilaterally evaluate a degree of abnormality from a plurality of indexes with respect to the manufacturing data Yi. As a result, it is possible to reduce overlooking of an abnormality of the manufacturing data Yi.

Figure 4:
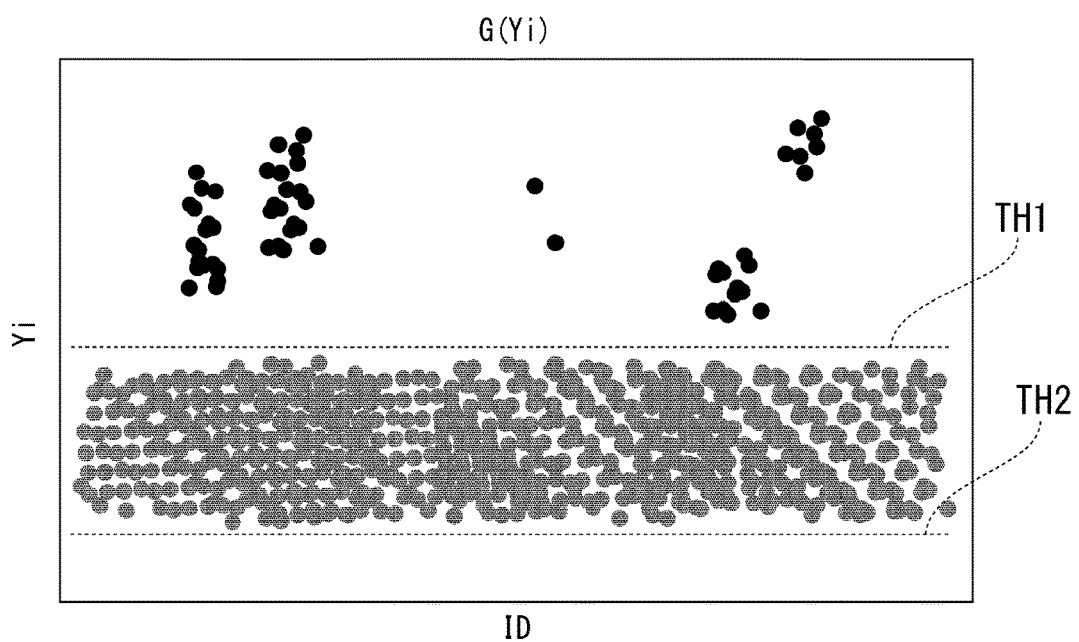
FIG. 4 is a diagram showing an example of a scatter diagram of manufacturing data $Y_i$ that serves as first analysis information $G(Y_i)$.

The first analysis information G(Yi) calculated in step S103 is more detailed information about the first index value F(Yi) to be presented to the user, and is, for example, a scatter diagram of the manufacturing data Yi. FIG. 4 is a diagram showing an example of a scatter diagram of the manufacturing data Yi that serves as the first analysis information G(Yi).

As shown in FIG. 4, in the scatter diagram that serves as the first analysis information G(Yi), the vertical axis represents a value of the manufacturing data Yi and the horizontal axis represents a product ID. Each point in FIG. 4 shows the manufacturing data of one individual product. In the data shown in FIG. 4, the manufacturing data Yi determined to be an abnormal value when the value of the manufacturing data Yi exceeds the first threshold value TH1 or is less than the second threshold value TH2 less than the first threshold value TH1 is plotted in a color different from that of the manufacturing data Yi determined to be a normal value between the first threshold value TH1 and the second threshold value TH2. Also, the first threshold value TH1 and the second threshold value TH2 are drawn by lines. By displaying the points indicating the manufacturing data Yi and the lines indicating the first threshold value TH1 and the second threshold value TH2, not only the distribution of the manufacturing data Yi but also the number of pieces of the manufacturing data Yi having an abnormal value and a distance from the threshold value (a magnitude of a value deviating from the threshold value) are intuitively easily understood by a user and the degree of abnormality can be visually displayed to the user.

Also, in the scatter diagram shown in FIG. 4, it is possible to easily identify a product in which an abnormality has occurred by setting the product ID on the horizontal axis. Therefore, the user can easily identify a product in which an abnormality has occurred. Alternatively, in the scatter diagram shown in FIG. 4, the horizontal axis may represent a time at which an abnormality occurred. In this case, a time at which (a time period in which) the abnormality occurred can be easily identified. Therefore, the user can easily identify a time at which (a time period in which) the abnormality occurred.

The first analysis information G(Yi) may be information of a diagram or the like other than the scatter diagram. For example, the first analysis information G(Yi) may be a histogram. FIG. 5 is a diagram showing an example of the histogram of the manufacturing data Yi used as the first analysis information G(Yi). Alternatively, the first analysis information G(Yi) may be a diagram such as a box plot or a violin plot. Also, the first analysis information G(Yi) may be numerical data instead of the diagram. FIG. 6 is a diagram showing an example of numerical data representing the first analysis information G(Yi). Alternatively, the first analysis information G(Yi) may be the number of products included in the analysis, the number of cells determined to be abnormal, or other basic numerical data. Because the first analysis information G(Yi) is represented by the above numerical data, the user can consider the abnormality together with the numerical data.

The first analyzer 242 may derive one piece of (single) first analysis information G(Yi) or two or more pieces of (a plurality of pieces of) first analysis information G(Yi). By deriving the plurality of pieces of first analysis information G(Yi), it is possible to evaluate a degree of abnormality of the manufacturing data Yi multilaterally from a plurality of indexes. As a result, it is possible to avoid overlooking of an abnormality and favorably assist the user.

Next, a process to be executed by the second analyzer 244 will be described. The second analyzer 244 changes a type of manufacturing condition data Cj used for a combination for each piece of manufacturing data Yi. Specifically, the second analyzer 244 creates a list of manufacturing condition data Cj to be combined with each piece of the manufacturing data Yi and performs calculation of the index value and generation of analysis information only for the manufacturing condition data Cj included in the list. The second analyzer 244 combines the manufacturing data {Yi: i=1, ..., N} and the manufacturing condition data {Cj: j=1, ..., M} to perform analysis for identifying a primary factor of the abnormality.

Here, for example, when a relationship between the manufacturing data Yi and the manufacturing condition data Cj is independent or when there is prior knowledge for narrowing down candidates for primary factors in advance, not all manufacturing condition data Cj may be included in candidates for the primary factor of the abnormality with respect to certain manufacturing data Yi. In this case, the calculation cost can be reduced by analyzing only the necessary manufacturing condition data Cj for each piece of manufacturing data Yi.

Also, a plurality of pieces of manufacturing condition data Cj may be combined with one piece of manufacturing data Yi to perform analysis. A case in which a combination of a plurality of pieces of manufacturing condition data Cj is a cause of an abnormality of one piece of manufacturing data Yi with respect to product manufacturing is conceivable. For example, a case in which a specific combination of manufacturing condition data Cj1 of a manufacturing device and manufacturing condition data Cj2 of a manufacturing material becomes a cause of an abnormality of the manufacturing data Yi is conceivable. In this case, for example, it is only necessary to handle a primary factor (the manufacturing condition data Cj1 of the manufacturing device and the manufacturing condition data Cj2 of the manufacturing material) of the combination of the two pieces of the manufacturing condition data Cj1 of the manufacturing device and the manufacturing condition data Cj2 of the manufacturing material as one primary factor (the manufacturing condition data Cj). Here, the number of combinations of primary factors (the manufacturing condition data Cj) may be two or three or more.

Figure 7:
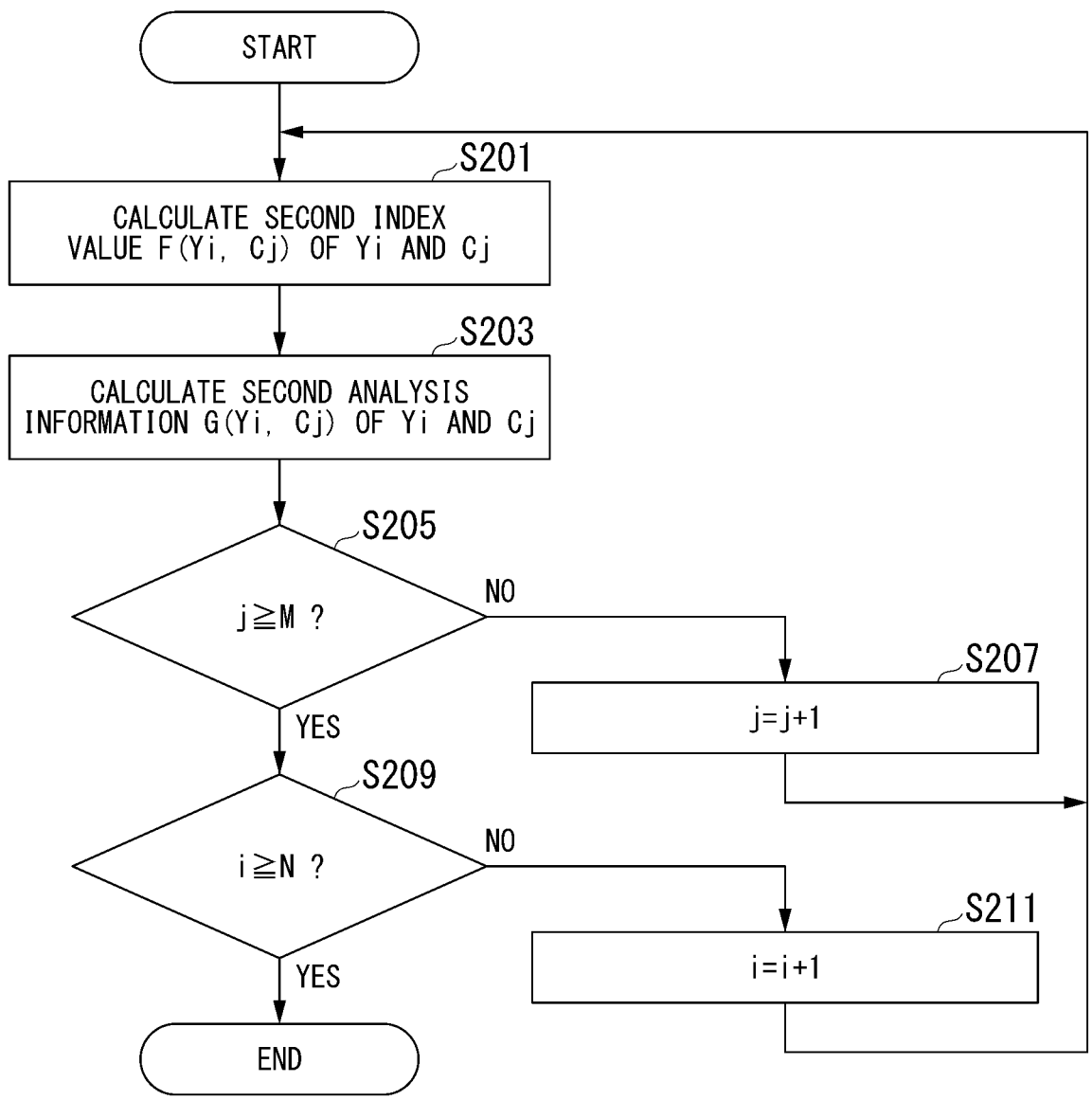
FIG. 7 is a flowchart showing an example of a process to be executed by a second analyzer.

FIG. 7 is a flowchart showing an example of a process to be executed by the second analyzer 244. As shown in FIG. 7, the second analyzer 244 derives all combinations of manufacturing data {Yi: i=1, ..., N} and manufacturing condition data {Cj: j=1, ..., M} by calculating second index values F(Yi, Cj) {j=1, ..., N} (step S201). Also, in the first processing of step S201, variables i and j=1.

Subsequently, the second analyzer 244 calculates second analysis information G(Yi, Cj) {i=1, ..., N} representing a result of analyzing the manufacturing data {Yi: i=1, ..., N} and the manufacturing condition data {Cj: j=1, ..., M} (step S203). Subsequently, the second analyzer 244 determines whether or not a value of the variable j is M or more (i≥M) (step S205). When it is determined that the value of the variable j is not M or more (or is less than N), the second analyzer 244 increments the variable j (step S207) and returns to the processing of step S201.

When it is determined that the value of the variable j is M or more, the second analyzer 244 determines whether or not the value of the variable i is N or more (i≥N) (step S209). When it is determined that the value of the variable i is not N or more (or is less than N), the second analyzer 244 increments the variable i (step S211) and returns to the processing of step S201. In this manner, the processing of steps S201 and S203 is executed with respect to all the manufacturing condition data Cj and the manufacturing data Yi and the second analyzer 244 ends the process shown in FIG. 7 when it is determined that the value of the variable j is M or more and the value of the variable i is N or more (or is N).

Figure 8:
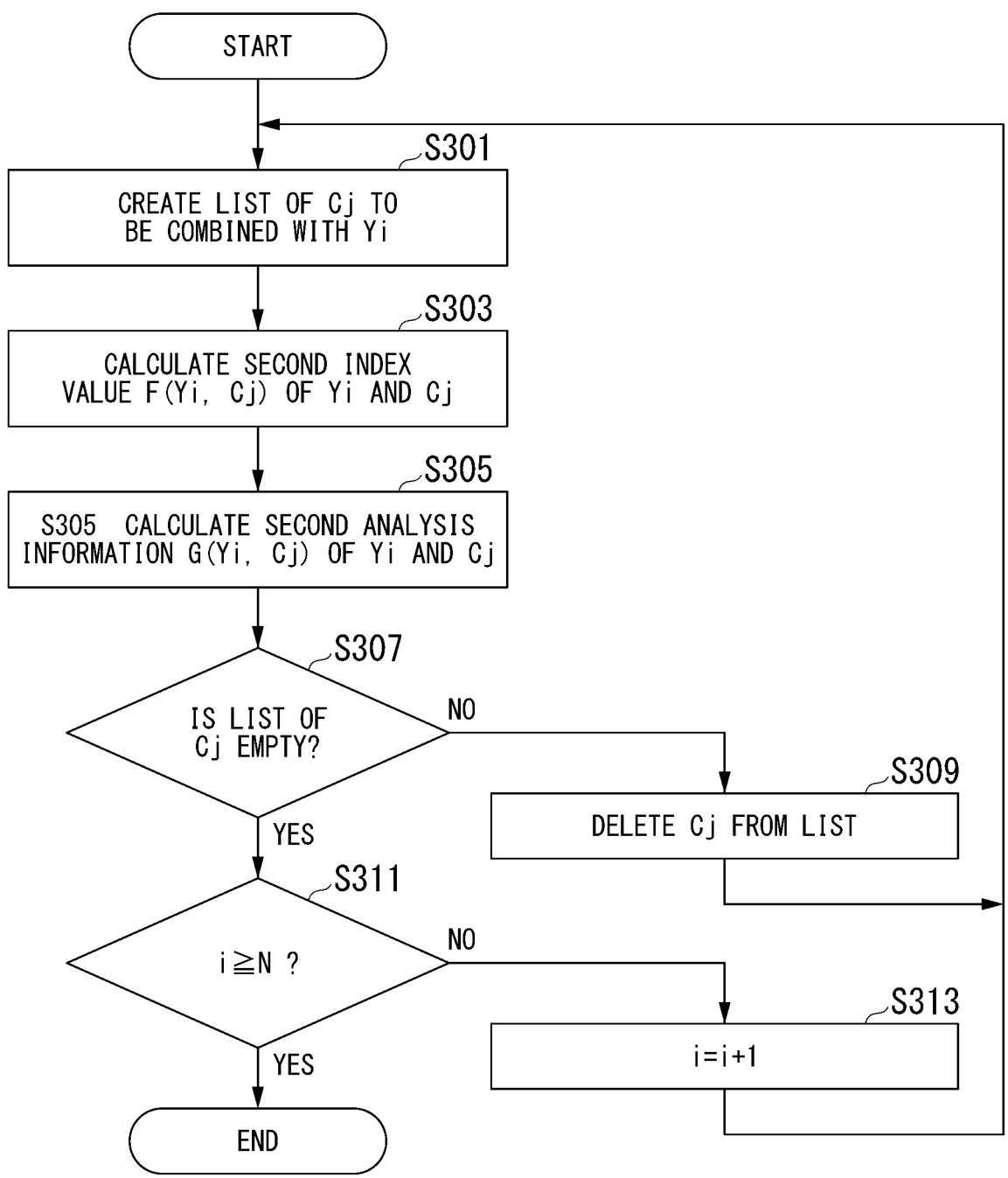
FIG. 8 is a flowchart showing another example of a process to be executed by the second analyzer.

The second analyzer 244 may perform a similar process in the procedure shown in FIG. 8. FIG. 8 is a flowchart showing another example of a process to be executed by the second analyzer 244. As shown in FIG. 8, the second analyzer 244 first creates a list of manufacturing condition data {Cj: j=1, ..., M} to be combined with the manufacturing data {Yi: i=1, ..., N} (step S301). In the first processing of first step S201, variables i and j=1. Subsequently, the second analyzer 244 calculates the second index value F(Yi, Cj) {j=1, ..., N} and derives all combinations of the manufacturing data {Yi: i=1, ..., N} and the manufacturing condition data {Cj: j=1, ..., M} (step S303).

Subsequently, the second analyzer 244 calculates second analysis information G(Yi, Cj) {i=1, ..., N} representing a result of analyzing manufacturing data {Yi: i=1, ..., N} and manufacturing condition data {Cj: j=1, ..., M} (step S305). Subsequently, the second analyzer 244 determines whether or not the list of manufacturing condition data Cj is empty (step S307).

When it is determined that the list of manufacturing condition data Cj is not empty, the second analyzer 244 deletes the manufacturing condition data Cj from which the second index value F(Yi, Cj) and the second analysis information G(Yi, Cj) are calculated from the list (step S309) and returns to the processing of step S301. When it is determined that the list of manufacturing condition data Cj is empty, the second analyzer 244 determines whether or not a value of the variable i is N or more (i≥N) (step S311). When it is determined that the value of the variable i is not N or more (or is less than N), the second analyzer 244 increments the variable i (step S313) and returns to the processing of step S301. When it is determined that the value of the variable i is N or more (or is N), the second analyzer 244 ends the process shown in FIG. 8.

The second index value F(Yi, Cj) in the first embodiment is an index representing a degree of abnormality that becomes clear by combining the manufacturing data Yi and the manufacturing condition data Cj and represents a probability of occurrence of an abnormality or a magnitude of the abnormality. In the first embodiment, it is assumed that the index represents a possibility that the manufacturing condition data Cj will be a cause of occurrence of the abnormality of the manufacturing data Yi.

In the first embodiment, the second index value F(Yi, Cj) is biased to a specific manufacturing condition of a product determined to be abnormal. Hereinafter, a case in which certain manufacturing condition data Cj represents a type of device will be described with reference to FIGS. 9 and 10.

Figures 9, 10, 11:
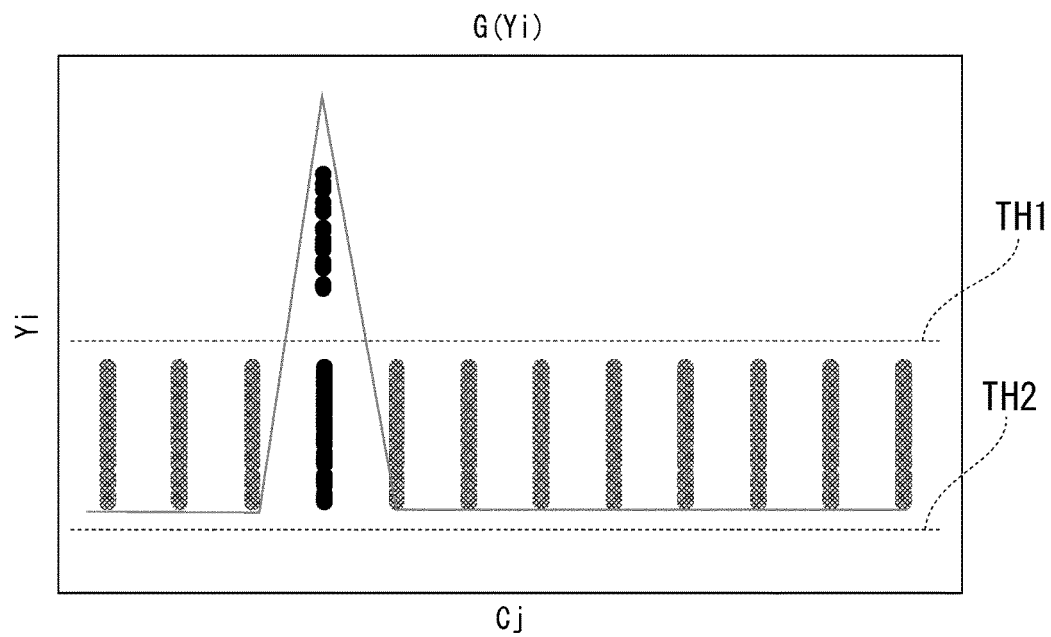
FIG. 9 is a diagram showing an example of numerical data representing second analysis information $G(Y_i, C_j)$.
FIG. 10 is a diagram showing an example of numerical data representing the second analysis information $G(Y_i, C_j)$.
FIG. 11 is a diagram showing an example of a scatter diagram of the manufacturing data $Y_i$ under manufacturing condition data $C_j$ that serves as the second analysis information $G(Y_i, C_j)$.

FIGS. 9 and 10 are diagrams showing an example of numerical data representing the second analysis information G(Yi, Cj).

It is assumed that the product of the present embodiment is processed by any one of devices A, B, and C during a manufacturing process. Here, the number of products for which the manufacturing data Yi is determined to be abnormal is incremented for each device. Any of the methods described in the description of the process of the analyzer 240 is used to determine the abnormality. In the example of the second analysis information G(Yi, Cj) shown in FIGS. 9 and 10, products determined to be abnormal are biased to a specific device in results shown in FIG. 10 compared with results shown in FIG. 9. Here, when the results shown in FIG. 10 have occurred, it suggests that the device B is likely to be a primary factor of occurrence of the abnormality. The analyzer 240 uses a magnitude of the bias as an index value. For example, (maximum bias rate)=(maximum number of products determined to be abnormal)/(total number of products determined to be abnormal) can be used as the index value of the magnitude of the bias. In this case, the maximum bias rate of the result shown in FIG. 9 is 20/60≈0.33, and the maximum bias rate of FIG. 10 is 50/60≈0.83.

Further, the analyzer 240 may formulate a bias when products determined to be abnormal are biased to a specific device in the framework of a statistical test and may estimate manufacturing conditions that are candidates for the cause of the skip value. The analyzer 240 first increments the number of products determined to be abnormal for each device (hereinafter referred to as the "number of abnormalities") with respect to the numbers of products manufactured in the devices. Next, the analyzer 240 represents the number of types of devices by K, represents the number of products by $N_i$ {i=1, 2, ..., K}, and represents the number of abnormalities by $O_i$ {i=1, 2, ..., K}. Also, the analyzer 240 represents the total number of products N by the following Eq. (1) and represents the total number of products determined to be abnormal (the total number of abnormalities) $N_o$ by the following Eq. (2).

$$N = \sum_{i=1}^{K} N_i \tag{1}$$

$$N_o = \sum_{i=1}^{K} O_i \tag{2}$$

Next, the analyzer 240 calculates the second index value F(Yi, Cj). The second index value F(Yi, Cj) is calculated using, for example, the statistical test method as described above. Specifically, first, the analyzer 240 regards the manufacturing data Yi, which is an analysis target, as being a population and establishes a null hypothesis that "abnormal products are randomly sampled from the population." Next, the analyzer 240 tests the null hypothesis and calculates a p value. The smaller the p value is, the more likely the hypothesis will be rejected. That is, the occurrence of the abnormality cannot be said to be randomly sampled and the manufacturing condition data Cj is regarded as being more likely to be associated with the cause of the abnormality of the manufacturing data Yi. The analyzer 240 uses a G test for the test. A G test is a type of likelihood ratio test and is widely used in situations where a chi-square test has been used in the past. In the G test, a G value shown in the following Eq. (3) is first calculated.

$$G = 2 \sum_{i=1}^{K} O_i \cdot \log_e(O_i/E_i) \tag{3}$$

In Eq. (3), $E_i$ is the number of products expected on the basis of the null hypothesis and can be obtained using the following Eq. (4).

$$E_i = N_o \cdot P(i) = N_o \cdot \frac{N_i}{N} \tag{4}$$

In Eq. (4), P(i) is an expected probability and is a probability that a product determined to be abnormal in an item i (an $i^{th}$ device) will occur if the null hypothesis is true. Because a true value for a probability value is unknown, the analyzer 240 approximates a frequency distribution $N_i/N$ of the number of products to be analyzed. Next, the analyzer 240 uses the chi-square distribution f(x, k) to calculate the p value corresponding to the G value in the following Eq. (5).

$$p = \int_G^\infty f(x,k)dx \tag{5}$$

In Eq. (5), k=K−1, which represents the degree of freedom of the chi-square distribution. In the chi-square distribution, the p value is less likely to be small when the degree of freedom k is higher. When the number of products determined to be abnormal with respect to K is small, a bias occurs even if random sampling is performed, but the significance of the bias is evaluated in consideration of the number of items due to the above-described characteristics. The analyzer 240 sets the p value in this case as the second index value F(Yi, Cj).

Also, although the p value is used as the second index value F(Yi, Cj) when the bias is quantified, an amount of effect may be used instead of the p value. Also, although the analyzer 240 quantifies the bias of the products in the above-described example, the second index value F(Yi, Cj) may also be obtained in another form. For example, the analyzer 240 may use the p value or the amount of effect (an F value) based on the analysis of variance. Also, the analyzer 240 may obtain a correlation coefficient between the manufacturing data Yi and the manufacturing condition data Cj in advance and set the correlation coefficient as the second index value F(Yi, Cj). In particular, when the manufacturing condition data Cj is a continuous value, the analyzer 240 preferably sets the correlation coefficient between the manufacturing data Yi and the manufacturing condition data Cj as the second index value F(Yi, Cj).

The second analysis information G(Yi, Cj) calculated in steps S203 and S303 is more detailed information about the second index value F(Yi, Cj) to be presented to the user, and is, for example, a scatter diagram of manufacturing data Yi under the manufacturing condition data Cj. FIG. 11 is a diagram showing an example of a scatter diagram of the manufacturing data Yi under the manufacturing condition data Cj that serves as the second analysis information G(Yi, Cj). In the second analysis information G(Yi, Cj) shown in FIG. 11, it is assumed that the manufacturing condition data Cj represents a type of device.

In FIG. 11, the vertical axis represents a value of the manufacturing data Yi and the horizontal axis represents a type of product as the manufacturing condition data Cj. Each point in FIG. 11 represents one individual product. Further, information about the second index value F(Yi, Cj) is included in FIG. 11. FIG. 11 shows the bias of products determined to be abnormal to a specific manufacturing condition. Thus, in FIG. 11, the first threshold value TH1 and the second threshold value TH2 are drawn by lines as threshold values for determining the abnormality and a bias rate for a specific manufacturing condition is shown as a broken line graph. Also, the color of the distribution of manufacturing conditions having a large bias is changed and emphasized. Thus, the distribution of the manufacturing data Yi and the bias for each piece of manufacturing condition data Cj can be intuitively easily understood and the degree of abnormality can be visually displayed to the user.

Figure 12:
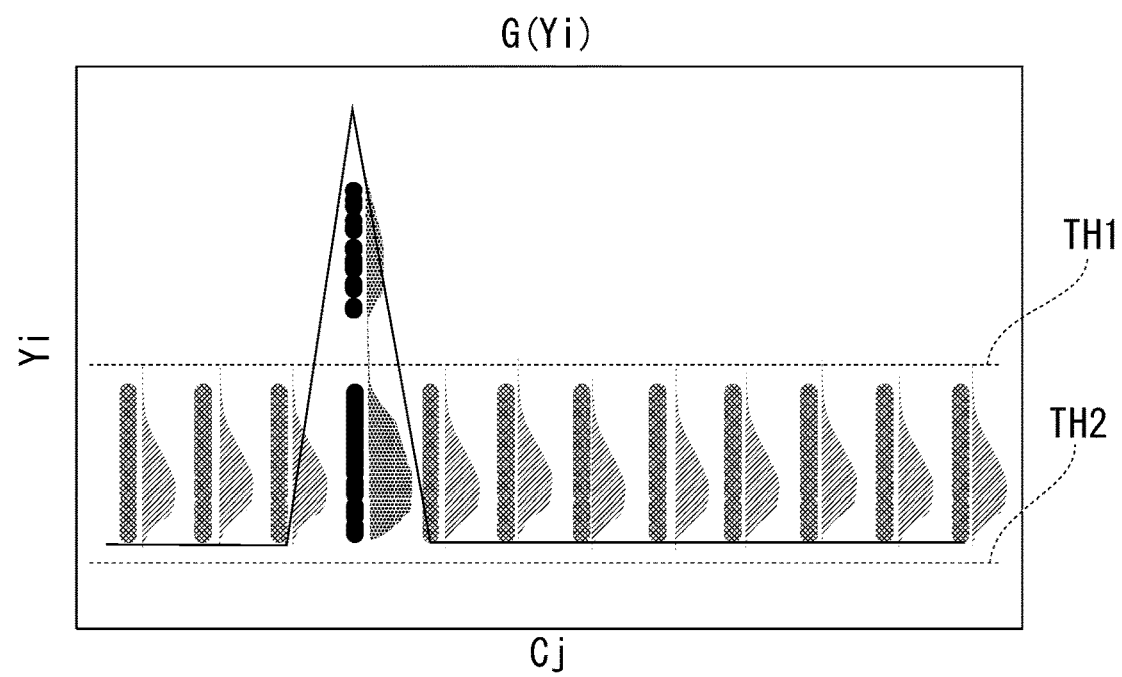
FIG. 12 is a diagram showing an example of a histogram of the manufacturing data $Y_i$ under the manufacturing condition data $C_j$ that serves as the second analysis information $G(Y_i, C_j)$.
Figure 13:
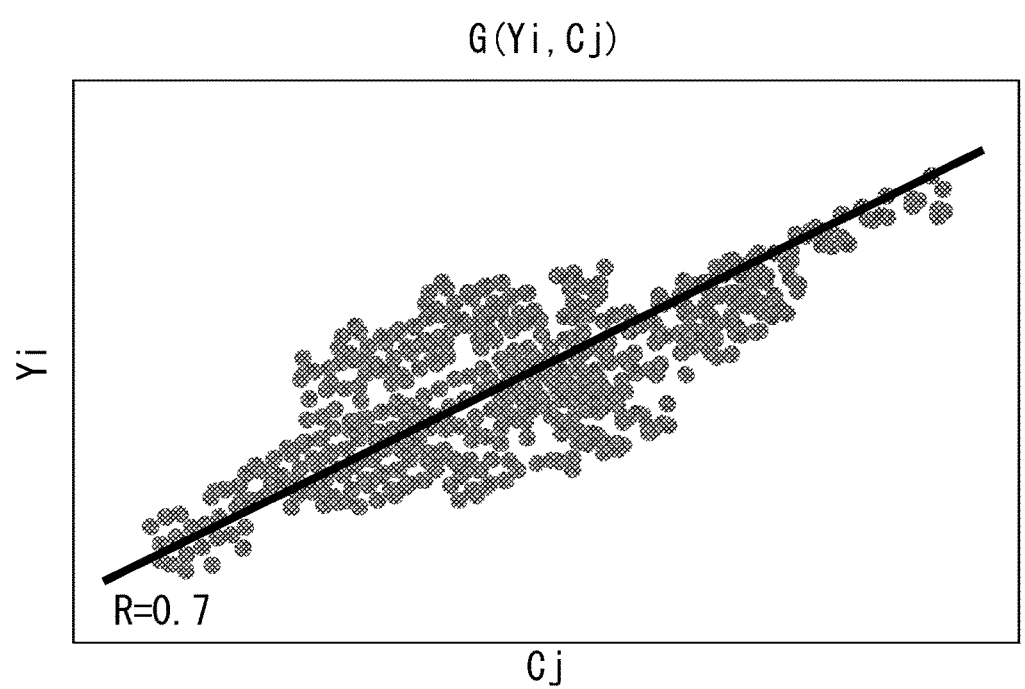
FIG. 13 is a diagram showing an example of a violin plot of manufacturing data $Y_i$ under the manufacturing condition data $C_j$ that serves as the second analysis information $G(Y_i, C_j)$.

The second analysis information G(Yi, Cj) may be represented by information of a diagram or the like other than the scatter diagram. For example, as shown in FIG. 12, the second analysis information G(Yi, Cj) may be a histogram. Also, a diagram such as a box plot or a violin plot shown in FIG. 13 may be used. By displaying the second analysis information G(Yi, Cj) in these diagrams and the like, the distribution for each manufacturing condition can be easily understood.

Although the manufacturing condition data Cj has been described as being categorical data in the first embodiment, the manufacturing condition data Cj may be numerical data. In this case, the scatter diagram shown in FIG. 11 or the like may be generated as the second analysis information G(Yi, Cj). Also, a regression line, a correlation coefficient, or the like may be displayed as information about the second index value F(Yi, Cj).

Although the second analyzer 244 generates one type of analysis result in the first embodiment, a plurality of types of analysis results may be generated. It is possible to avoid overlooking of abnormalities and assist the user by generating a plurality of analysis results.

The generator 260 determines an amount of information and a priority of a first image including an image showing the first analysis information G(Yi) on the basis of the index value of the manufacturing data Yi derived by the first analyzer 242. The generator 260 determines an amount of information and a priority of a second image including an image showing second information data on the basis of the index value of the manufacturing condition data Cj derived by the second analyzer 244. The generator 260 generates visualized data according to the determined amounts of information and the determined priorities of the first image and the second image and outputs the visualized data to the display device 300.

Next, a process of the generator 260 will be described. The generator 260 generates visualized data including information about a first index value F(Yi) and information about a second index value F(Yi, Cj). The generator 260 generates visualized data by including information of a first analysis result display region (hereinafter referred to as a "first display region") in the display device 300 that displays a first image and a second analysis result display region (hereinafter referred to as a "second display region") in the display device 300 that displays a second image in the visualized data. The generator 260 generates data for providing a plurality of first display regions and a plurality of second display regions. The generator 260 determines an amount of information to be displayed in each of first display regions as the first image and its display priority on the basis of the first index value F(Yi) and determines an amount of information to be displayed in each of second display regions as the second image and its display priority on the basis of the second index value F(Yi, Cj). The visualized data may be drawing data for displaying an image on the display device 300 or may have a data format that can be displayed on the display device 300, for example, a data format such as html, xml, or json.

Figure 14:
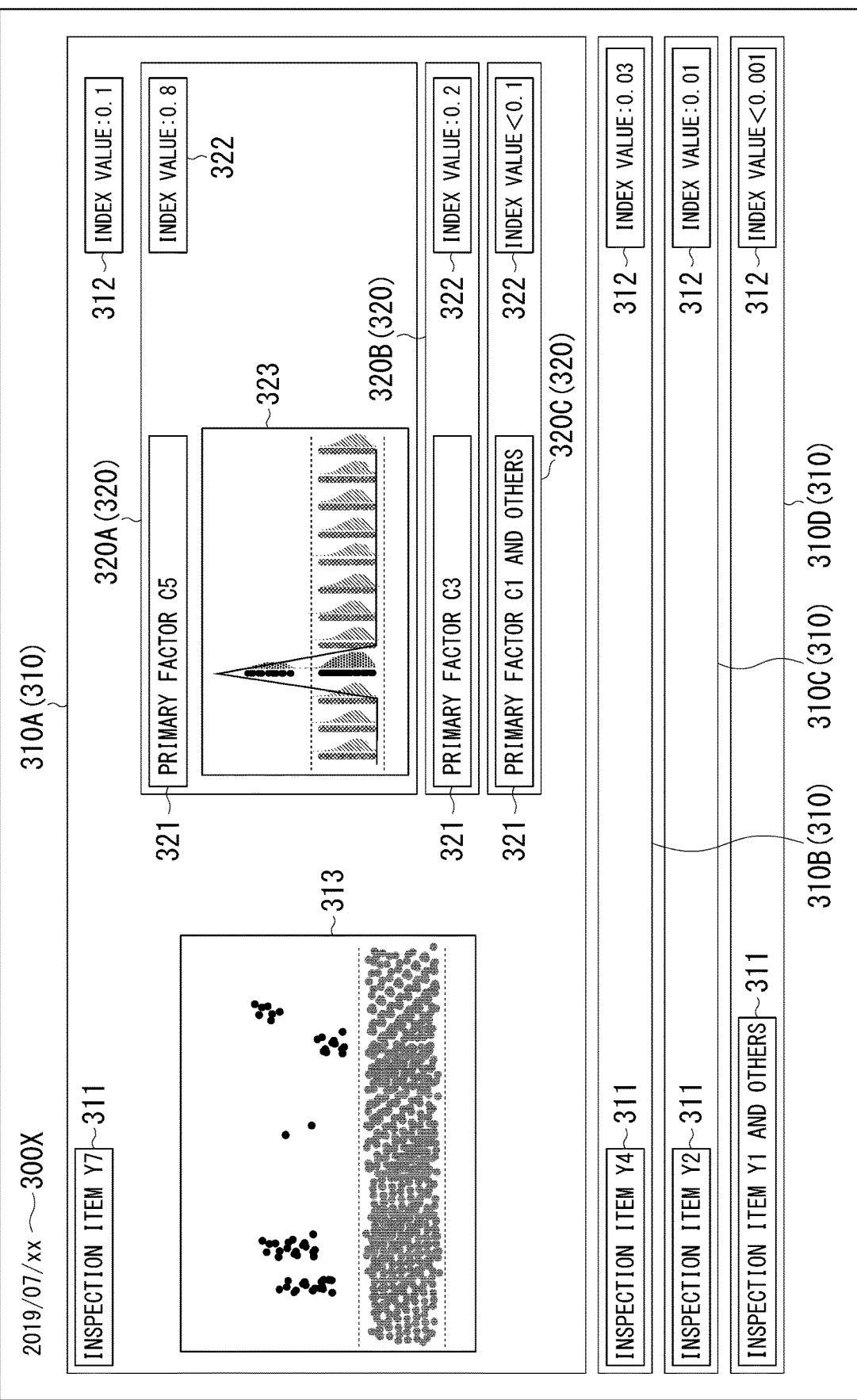
FIG. 14 is a diagram showing an example of a screen displayed on a display device.

The display device 300 includes, for example, a liquid crystal display. The display device 300 displays the first images and the second images on the basis of the visualized data transmitted by the generator 260. A first display region and a second display region are set on the screen of the display device 300. The first image is displayed in the first display region on the display device 300 and the second image is displayed in the second display region on the display device 300. FIG. 14 is a diagram showing an example of a screen displayed on the display device 300. An operation of the generator 260 will be described below with reference to the screen shown in FIG. 14 or the like. The generator 260 generates visualized data for displaying an image as shown in FIG. 14 on a screen 300A of the display device 300 to be described below.

As shown in FIG. 14, a first display region for displaying a plurality of first images 310 and a second display region for displaying a second image 320 are set in the screen 300A of the display device 300. Also, an analysis target image 300X for identifying an analysis target is displayed in an upper left portion of the screen 300A. In the example shown in FIG. 14, first- to fourth-stage first display regions in which first-to fourth-stage first images 310A to 310D are displayed, respectively, are set in the screen 300A of the display device 300. Although the number of first display regions which are displayed is four in the first embodiment, the number of first display regions which are displayed may be any one from one to three or may be six or more.

In the first-stage first image 310A displayed in the first-stage first display region among the above-described display regions, a measured value name image 311, a first index value image 312, a first analysis information image 313, and a second image 320 are displayed. The measured value name image 311 and the first index value image 312 are displayed in the second- to fourth-stage first images 310B to 310D. The measured value name image 311 is an image showing a name of a measurement item (a measured value name) in the manufacturing data Yi. The first index value image 312 is an image showing the first index value F(Yi). The first analysis information image 313 is an image showing the first analysis information G(Yi).

The second image 320 displayed on the first-stage first image 310A includes first- to third-stage second images 320A to 320C and the first- to third-stage second display regions in which the first- to third-stage second images 320A to 320C are displayed, respectively, are set in the first-stage first display region on the screen 300A of the display device 300. Although three second display regions are displayed in the first embodiment, the number of second display regions may be one or two or may be three or more.

A manufacturing condition name image 321, a second index value image 322, and a second analysis information image 323 are displayed on the first-stage second image 320A displayed in the first-stage second display region among the display regions. The manufacturing condition name image 321 and the second index value image 322 are displayed on the second-stage second image 320B and the third-stage second image 320C. The content of each item will be described below.

The first image 310 is an image showing information about each piece of manufacturing data $\{Yi: i=1, \ldots, N\}$ for a plurality (N) of products and the first display region is a region for displaying the first image 310. Thus, the generator 260 generates data for setting the first image 310 and the first display region for displaying the first image 310 as the visualized data. The generator 260 generates visualized data for displaying an image including at least one of the measured value name image 311, the first index value image 312, and the first analysis information image 313 as the first image 310.

Although all of the N first images 310 may be displayed on the screen 300A of the display device 300, a display area and the number of first images 310 to be displayed may be limited from a relationship of an area of the screen 300A and the like. Thus, the generator 260 sets an amount of information and a priority of the first image 310 on the basis of the first index value F(Yi) of the displayed manufacturing data Yi with respect to the plurality of first images 310.

For example, the generator 260 sets the amount of information of the first image 310 so that an amount of information of the first image 310 for displaying the manufacturing data Yi having a large first index value F(Yi) is larger than an amount of information of the first image 310 for displaying the manufacturing data Yi having a small first index value F(Yi). Thus, for example, the generator 260 may perform the following handling. The generator 260 sets a first threshold value and a second threshold value smaller than the first threshold value for the first index value F(Yi) of the manufacturing data Yi that is displayed on the first image 310. When the first index value F(Yi) of the manufacturing data Yi is larger than the first threshold value, the generator 260 causes the measured value name image 311, the first index value image 312, and the first analysis information image 313 to be displayed as the first image 310. Also, when the first index value F(Yi) of the manufacturing data Yi displayed on the display device 300 is less than or equal to the first threshold value and greater than the second threshold value, the generator 260 causes the measured value name image 311 and the first index value image 312 to be displayed as the first image 310. Also, when the first index value F(Yi) of the manufacturing data Yi displayed on the display device 300 is less than or equal to the second threshold value, the generator 260 causes the measured value name image 311 to be displayed as the first image 310. Alternatively, the generator 260 may be configured so that the first image 310 in which the first index value F(Yi) of the manufacturing data Yi displayed on the display device 300 is less than a specific threshold value is hidden. In this case, the generator 260 may cause the display device 300 to display the fact that the first index value F(Yi) of the displayed manufacturing data Yi is less than the specific threshold value instead of the first image 310. Also, when the amount of information to be displayed as the first image 310 is large, the generator 260 may make the display area larger than when the amount of information to be displayed is small. For example, the first-stage first image 310A shown in FIG. 14 has a larger amount of information to be displayed than the second-stage first image 310B. In this case, the generator 260 may make the display area of the first-stage first image 310A larger than the display area of the second-stage first image 310B.

Also, for example, the generator 260 makes the priority of the first image 310 for displaying the manufacturing data Yi having the larger first index value F(Yi) higher than the priority of the first image 310 for displaying the manufacturing data Yi having the smaller first index value F(Yi). In this case, the generator 260 may cause the display device 300 to display the first images 310 side by side from the top in a descending order of priority. Also, the generator 260 may adjust the display form of the display region, or cause the first display region to be highlighted and displayed, with respect to the first image 310 having a high priority. As a form in which the display form of the display region is adjusted or in which the first display region is highlighted and displayed, the display region may be displayed in a state in which the display region is surrounded in a specific color, for example, red, or the name of each item, for example, the manufacturing data name, may be displayed in bold type. Also, a shape, a size, brightness, or the like of the display region may be adjusted or a still image and a moving image may be separated. Also, the generator 260 may cause a warning or caution mark to be displayed when the manufacturing data Yi having a large first index value F(Yi) is shown or may cause these marks to be displayed in a specific color, for example, red. Also, the generator 260 may make the first image 310 having a low priority inconspicuous by thinning the first display region. The generator 260 may set a threshold value for a level of a priority and may make a determination on the basis of whether the priority is higher or lower than or equal to the threshold value or the like. Also, at the time of displaying on the plurality of first images 310, the generator 260 determines a display position of the first image 310 in accordance with the priority of the first image 310 and causes the first image 310 having a high priority to be displayed at a position easier to see than the first image 310 having a low priority. For example, in the example shown in FIG. 14, the first-stage first image 310A has a higher priority than the second-stage first image 310B and the generator 260 causes the first-stage first image 310A to be displayed at a position easier to see for the user in an upper portion than the second-stage first image 310B.

Also, the generator 260 causes M second images 320 to be displayed inside the first image 310. Here, although the generator 260 may cause all of the M second images 320 to be displayed inside the first image 310, a display area of the second images 320 to be displayed and the number of second images 320 may be limited from the relationship such as the area of the screen 300A and the like. Thus, the generator 260 sets the amount of information and the priority of the second image 320 on the basis of the second index value F(Yi, Cj) of the manufacturing data Yi that is displayed with respect to the plurality of second images 320.

The second image 320 is an image showing information about each of combinations of the manufacturing data {Yi: i=1, ..., N} and the manufacturing condition data {Cj: j= 1, ..., M} with respect to combinations of a plurality (N) of products and a plurality (M) of manufacturing conditions. The second analysis information G(Yi, Cj) which is displayed on the second image 320 is displayed in association with the manufacturing data Yi. In the example shown in FIG. 14, the second image 320 is displayed within the first image 310 and therefore is associated with the manufacturing data Yi. In this case, the association with the manufacturing data Vi is visually easily understood. Also, the name of the manufacturing data that is displayed may be only the name of the manufacturing condition data Cj.

The second display region is a region for displaying the second image 320. Thus, the generator 260 generates visualized data for setting the second image 320 and the second display region where the second image 320 is displayed. The generator 260 causes an image including at least one of the manufacturing condition name image 321, the second index value image 322, and the second analysis information image 323 to be displayed as the second image 320. The manufacturing condition name image 321 is an image showing a name of a manufacturing condition item (a manufacturing condition name). The manufacturing condition here is, for example, a condition that becomes a cause of an abnormality occurring in the product. The second index value image 322 is an image showing the second index value F(Yi, Cj). The second analysis information image 323 is an image showing the second analysis information G(Yi, Cj).

For example, the generator 260 sets the amount of information of the second image 320 so that an amount of information of the second image 320 for displaying the manufacturing data Yi having a large second index value F(Yi, Cj) is larger than an amount of information of the first image 310 for displaying the manufacturing data Yi having a large second index value F(Yi, Cj). For example, the following handling may be performed. The generator 260 sets a first threshold value and a second threshold value less than the first threshold value for the second index value F(Yi, Cj) that is displayed on the second image 320. When the displayed second index value F(Yi, Cj) is greater than the first threshold value, the manufacturing condition name image 321, the second index value image 322, and the second analysis information image 323 are displayed as the first image 310. Also, when the second index value F(Yi, Cj) is less than or equal to the first threshold value and greater than the second threshold value, the generator 260 causes the manufacturing condition name image 321 and the second index value image 322 to be displayed as the second image 320. Also, the generator 260 causes the manufacturing condition name image 321 to be displayed as the second image 320 when the second index value F(Yi, Cj) is less than or equal to the second threshold value. Alternatively, the generator 260 may be configured so that the second image 320 in which the displayed second index value F(Yi, Cj) is less than a specific threshold value is hidden. In this case, the fact that the second index value F(Yi, Cj) is less than the specific threshold value may be displayed instead of the second image 320. Also, when the amount of information to be displayed as the second image 320 is large, the generator 260 may make the display area larger than when the amount of information to be displayed is small. For example, the first-stage second image 320A shown in FIG. 14 has a larger amount of information to be displayed than the second-stage second image 320B. In this case, the generator 260 may make the display area of the first-stage second image 320A larger than the display area of the second-stage second image 320B.

Also, for example, the generator 260 makes the priority of the second image 320 for displaying the manufacturing condition data Cj having the larger second index value F(Yi, Cj) higher than the priority of the second image 320 for displaying manufacturing condition data Cj having the smaller second index value F(Yi, Cj). In this case, the generator 260 may cause the display device 300 to display the second images 320 side by side from the top in a descending order of priority. Also, the generator 260 may cause the second display region to be highlighted and displayed with respect to the second images 320 having a high priority. As a form in which the display region is highlighted, the display region may be surrounded in a specific color, for example, red, or the name of each item, for example, the manufacturing data name, may be displayed in bold type. Also, the generator 260 may cause a warning or caution mark to be displayed when the manufacturing condition data Cj having a large second index value F(Yi, Cj) is shown or may cause these marks to be displayed in a specific color, for example, red. Also, the generator 260 may make the second image 320 having a low priority inconspicuous by thinning the second display region. The generator 260 may set a threshold value for a level of priority and may make a determination on the basis of whether the priority is higher or lower than or equal to the threshold value or the like. Also, when the plurality of second images 320 are displayed on the screen 300A, the generator 260 determines the display position of the second image 320 in accordance with the priority of the second image 320 and causes the second image 320 having a high priority to be displayed at a position easier to see than the second image 320 having a low priority. For example, in the example shown in FIG. 14, the first-stage second image 320A has a higher priority than the second-stage second image 320B and the generator 260 causes the first-stage second image 320A to be displayed at a position easier to see for the user in an upper portion than the second-stage second image 320B.

Also, the generator 260 may determine the manufacturing condition data Cj to be displayed as the second image 320 included in the first image 310 on the basis of a correlation with the manufacturing data Yi displayed in the first image 310. For example, when there is an abnormality based on the manufacturing condition data Cj that is likely to occur in the specific manufacturing data Yi, the manufacturing condition data Cj may be displayed as the second image 320 by raising the priority of the manufacturing condition data Cj in which an abnormality is likely to occur in the first image 310 that displays the manufacturing data Yi. Alternatively, when there is manufacturing condition data in which an abnormality is likely to occur in the correlation between the manufacturing condition data Cj, the generator 260 may be configured to cause the manufacturing condition data Cj to be displayed as the second image 320 by raising the priority of the manufacturing condition data Cj.

Also, when the amount of information and the priority are set as the relationship between the first index value F(Yi) and the second index value F(Yi, Cj) in the first embodiment, the generator 260 causes the first index value F(Yi) to be prioritized over the second index value F(Yi, Cj). On the other hand, when the amount of information and the priority are set, the generator 260 may cause the second index value F(Yi, Cj) to be prioritized over the first index value F(Yi). For example, even if it is determined that the first image 310 is hidden on the basis of the first index value F(Yi) with respect to certain manufacturing data Yi and certain manufacturing condition data Cj, the generator 260 may cause some or all of the measured value name image 311, the first index value image 312, the first analysis information image 313, and the second image 320 among items to be displayed in the first image 310 to be displayed by increasing the amount of information of the first image 310 when it is determined that the second image 320 is not hidden in the determination based on the second index value F(Yi, Cj).

According to the first embodiment, the visualized data generation device 200 includes the acquisitor 220 configured to acquire manufacturing data regarding a product state; the analyzer 240 configured to analyze the manufacturing data acquired by the acquisitor 220 and derive a first index value F(Yi) of the manufacturing data; and the generator 260 configured to determine at least one of an amount of information and a priority of a first image to be displayed on the display device 300 in relation to the manufacturing data on the basis of the first index value F(Yi) and generate visualized data according to the at least one of the amount of information and the priority that has been determined, so that it is possible to avoid overlooking of an abnormality in a product and the like.

In the manufacturing industry, activity steps are generally performed to detect abnormalities by acquiring and monitoring manufacturing data during the manufacturing process so that abnormalities in products are detected at an early stage. When such activity steps are performed, the content of manufacturing data varies and, for example, names of used materials and devices are recorded as data regarding product manufacturing conditions and sizes, electrical characteristics, physical characteristics, and the like are measured and recorded as data regarding product states. Usually, these data items are recorded in association with an ID, a serial number, or the like that is information for identifying each individual product.

By monitoring each item of product inspection data, there is a possibility that an abnormality in a product or a device can be detected. For example, when a value of the inspection data of some products in a product group manufactured during a certain period is different from a normal value, there is a possibility that the product will have an abnormality. In this case, the manufacturing data is scrutinized to find a cause of the abnormality. For example, if some products are manufactured only by a specific device, there is a possibility that the device will be a cause of occurrence of the abnormality.

As the number of processes to be required or the number of devices to be used to complete a product increases, an amount of data required to be monitored increases. Also, with the development of Internet of Things (IoT) technology, various data regarding manufacturing can be easily acquired and the number of manufacturing data items is significantly increasing. Thereby, it is difficult to manually monitor the manufacturing data. There is a demand for a system that assists the user in performing monitoring or the like by automating the analysis and visualization of manufacturing data. In such a system that assists the user in monitoring manufacturing data, there is a need to reduce the burden on the user and reduce the risk of overlooking abnormality detection.

Also, in Patent Document 1, N pieces of data and M pieces of data are displayed in a matrix of N×M and presented to the user. When there are many data items, a matrix size significantly increases. Thus, the visibility and operability are deteriorated and the deterioration thereof may lead to the burden on the user or overlooking. Also, sorting can be performed on the basis of statistics. However, because the order of sorting is different in each row and each column, the user needs to perform a sorting operation each time and many operations are required to access an item highly associated with an abnormality. Also, for a similar reason, even if a part is hidden using the statistic as an index value, hidden items are different in each row and each column, so that the matrix size cannot be reduced.

The visualized data generation device 200 of the first embodiment includes the acquisitor 220 configured to acquire manufacturing data regarding a product state; the analyzer 240 configured to analyze the manufacturing data acquired by the acquisitor 220 and derive a first index value F(Yi) of the manufacturing data; and the generator 260 configured to determine at least one of an amount of information and a priority of a first image to be displayed on the display device 300 in relation to the manufacturing data on the basis of the first index value F(Yi) and generate visualized data according to the at least one of the amount of information and the priority that has been determined.

Also, for example, the visualized data generation device 200 of the first embodiment preferentially displays detailed information such as a measured value name and a chart regarding an index value in the higher order within the display data with respect to the first index value F(Yi) of the manufacturing data Yi having a high index value, i.e., highly associated with the abnormality, or the second index value F(Yi, Cj) of a combination of the manufacturing data Yi and the manufacturing condition data Cj. On the other hand, outlines such as only a measured value name and an index value are included and displayed in the lower order within the display data with respect to the first index value F(Yi) of the manufacturing data Yi having a low index value, i.e., lowly associated with the abnormality, or the second index value F(Yi, Cj) of a combination of the manufacturing data Yi and the manufacturing condition data Cj. Also, if the index value is less than a predetermined value, the index data is hidden. Thus, it is possible to avoid overlooking of an abnormality in the product, reduce the burden on the user, and reduce the risk of overlooking abnormality detection.

Second Embodiment

Figure 15:
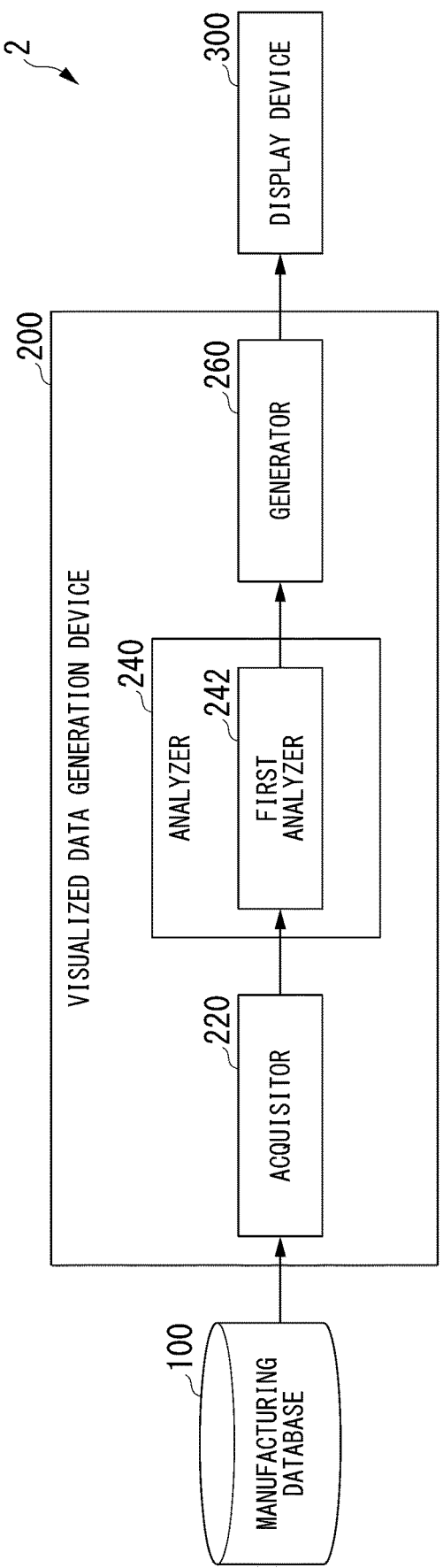
FIG. 15 is a block diagram showing a functional configuration of a visualized data generation system according to a second embodiment.
Figure 16:
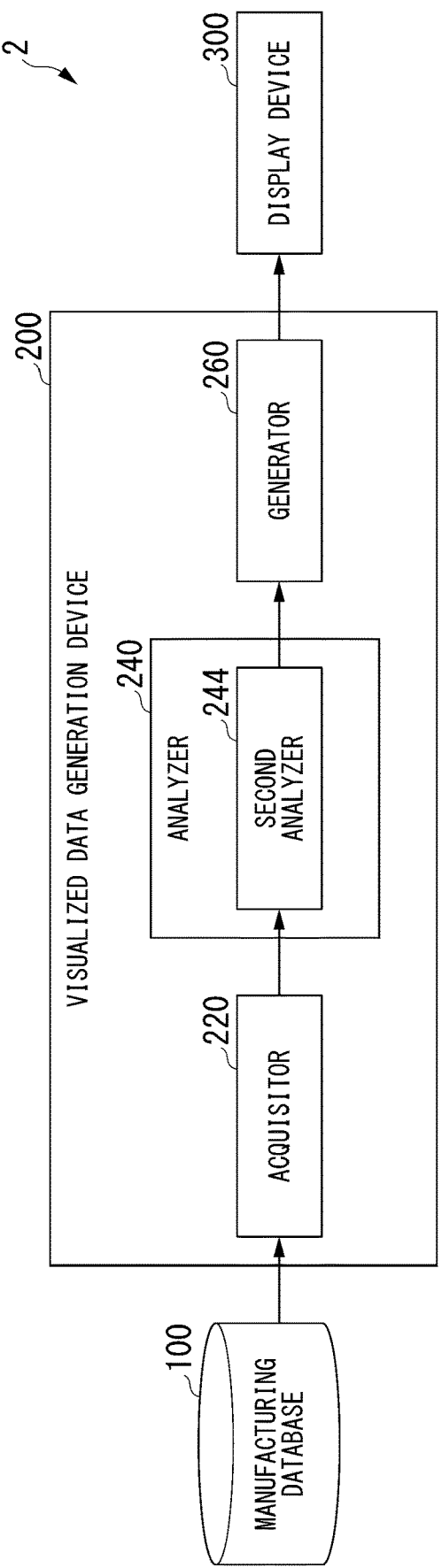
FIG. 16 is a block diagram showing another example of a functional configuration of the visualized data generation system according to the second embodiment.

Next, a second embodiment will be described. FIG. 15 is a block diagram showing a functional configuration of a visualized data generation system 2 according to the second embodiment. FIG. 16 is a block diagram showing another example of a functional configuration of the visualized data generation system 2 according to the second embodiment. As shown in FIGS. 15 and 16, the visualized data generation system 2 of the second embodiment includes, for example, a manufacturing database 100, a visualized data generation device 200, and a display device 300. The visualized data generation device 200 includes, for example, an acquisitor 220, an analyzer 240, and a generator 260. The second embodiment is different from the first embodiment in that the analyzer 240 includes the first analyzer 242 but does not include a second analyzer as shown in FIG. 15 or in that the analyzer 240 includes a second analyzer 244 but does not include the first analyzer 242 as shown in FIG. 16.

Although it is necessary to detect, for example, an abnormality based on manufacturing data Yi and an abnormality based on a combination of manufacturing data Yi and manufacturing condition data Cj, in the manufacturing industry, it may be sufficient to detect the abnormality based on the manufacturing data Yi. Alternatively, it may also be sufficient to detect an abnormality based on the combination of the manufacturing data Yi and the manufacturing condition data Cj. Also, there is a case in which detailed analysis information is not necessary and only the information about the index value for each measured value is necessary. The visualized data generation device 200 of the second embodiment is used, for example, when it is sufficient to detect an abnormality based on the manufacturing data Yi. Hereinafter, the visualized data generation device 200 of the second embodiment will be described in a state in which description of parts similar to those of the visualized data generation device 200 of the first embodiment is omitted.

First Example of Second Embodiment

Figure 17:
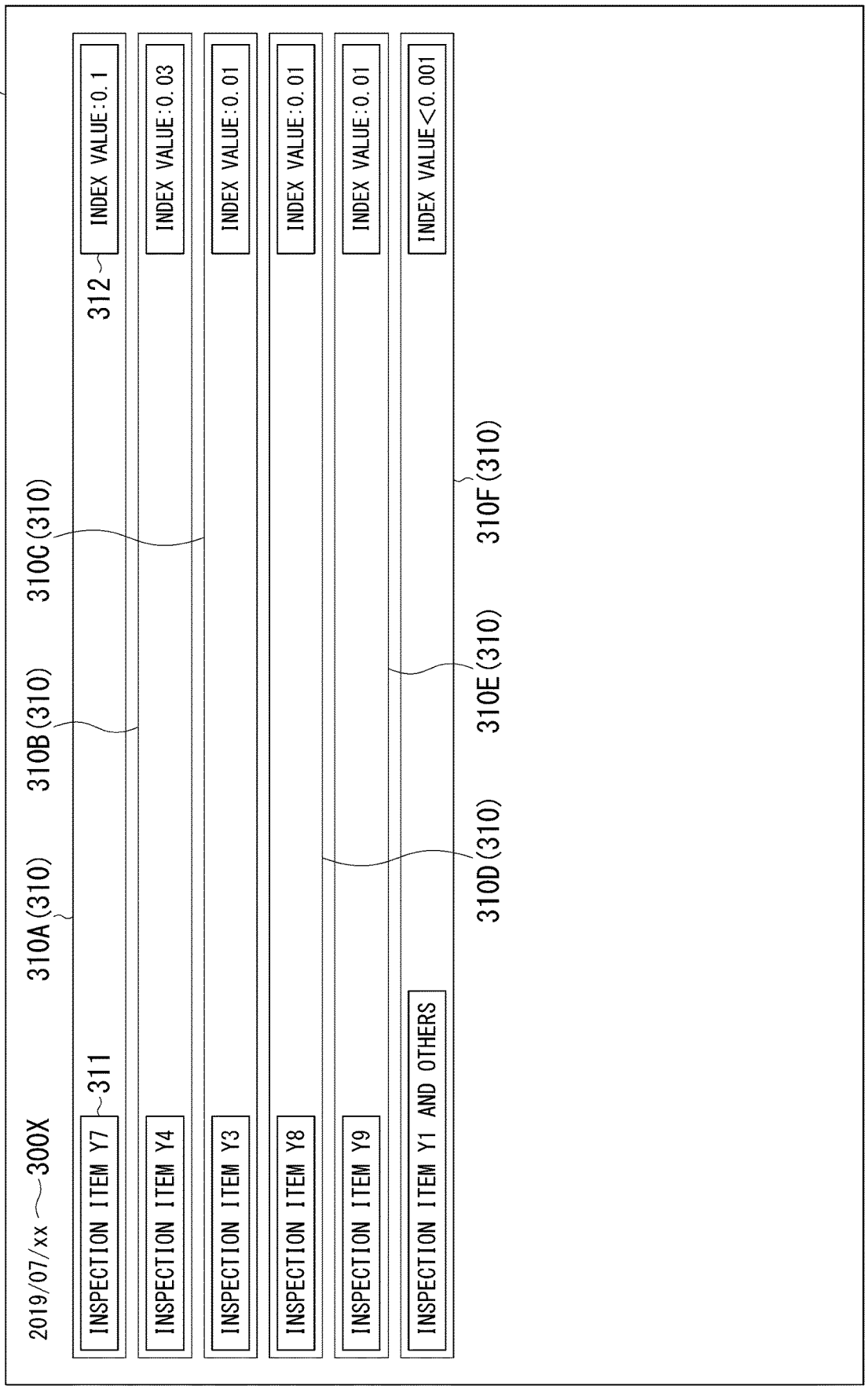
FIG. 17 is a diagram showing an example of a screen displayed on a display device according to the second embodiment.

As shown in FIG. 15, the first analyzer 242 of the analyzer 240 derives a first index value F(Yi). The generator 260 sets a priority of a first image 310 including an image showing the first analysis information G(Yi) on the basis of the first index value F(Yi) of the manufacturing data Yi derived by the first analyzer 242. The generator 260 generates visualized data according to the set priority of the first image 310 and outputs the visualized data to the display device 300. FIG. 17 is a diagram showing an example of a screen displayed on the display device 300 according to the second embodiment. As shown in FIG. 17, in the visualized data generation system 2 of the first example of the second embodiment, for example, a plurality of first images 310 are displayed on the display device 300 according to the priority set by the first index value F(Yi). A measured value name image 311 and a first index value image 312 are displayed in the first image 310 (first- to sixth-stage first images 310A to 310F).

Second Example of Second Embodiment

Figure 18:
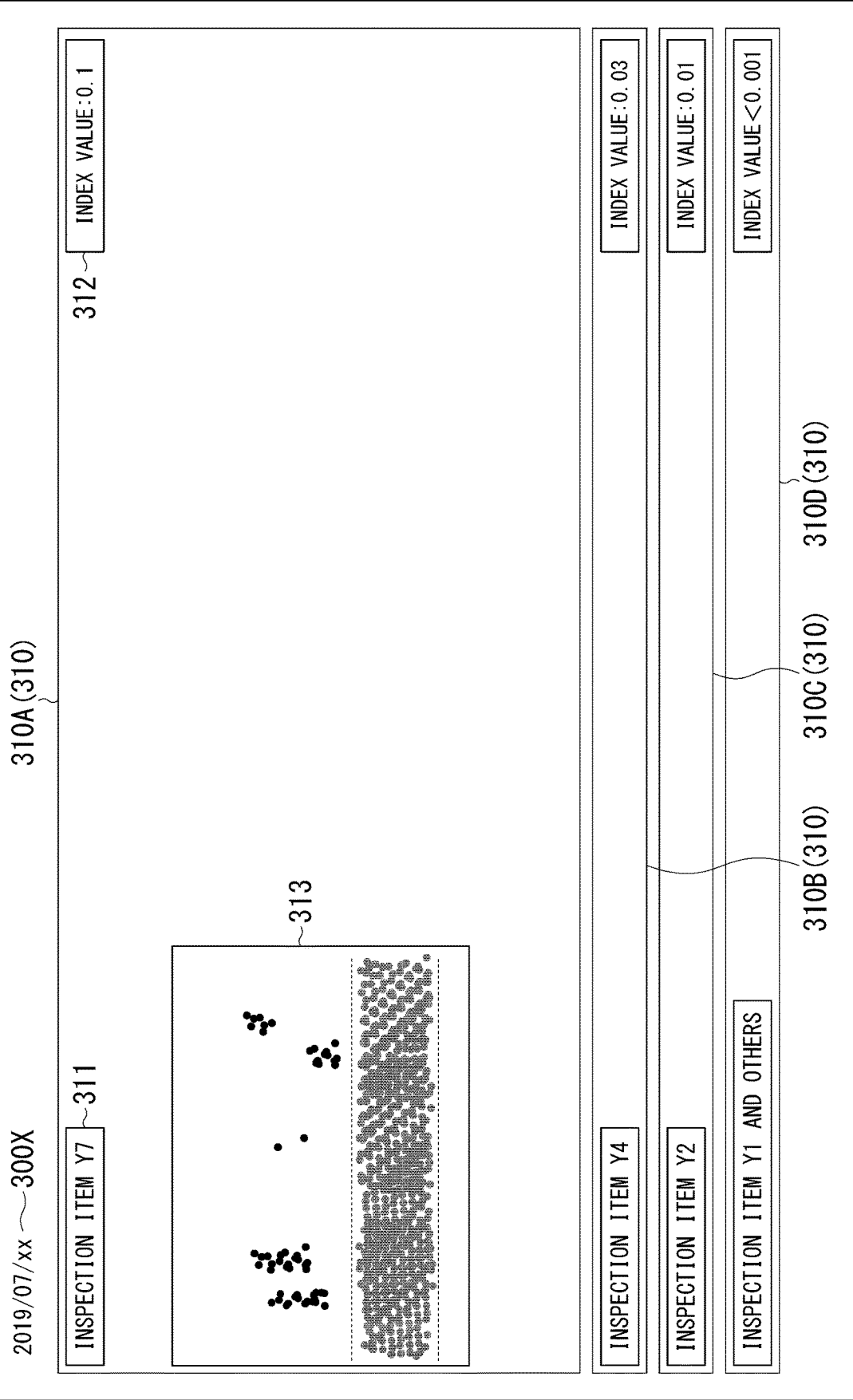
FIG. 18 is a diagram showing another example of a screen displayed on the display device according to the second embodiment.

Also, the first analyzer 242 of the analyzer 240 may derive a first index value F(Yi) and calculate first analysis information G(Yi). In this case, the generator 260 may set an amount of information and a priority of the manufacturing data Yi on the basis of the first index value F(Yi). The generator 260 generates visualized data according to the set amount of information and the set priority of the first image 310 and outputs the visualized data to the display device 300. FIG. 18 is a diagram showing another example of a screen displayed on the display device 300. As shown in FIG. 18, in the visualized data generation system 2 of the second example of the second embodiment, for example, a plurality of first images 310 according to the amount of information and the priority set by the first index value F(Yi) are displayed on the display device 300. A measured value name image 311 and a first index value image 312 are displayed in the first image 310 (first- to fourth-stage first images 310A to 310D). Also, in the first-stage first image 310A set to have a large amount of information, the first analysis information image 313 is also displayed.

Third Example of Second Embodiment

Figure 19:
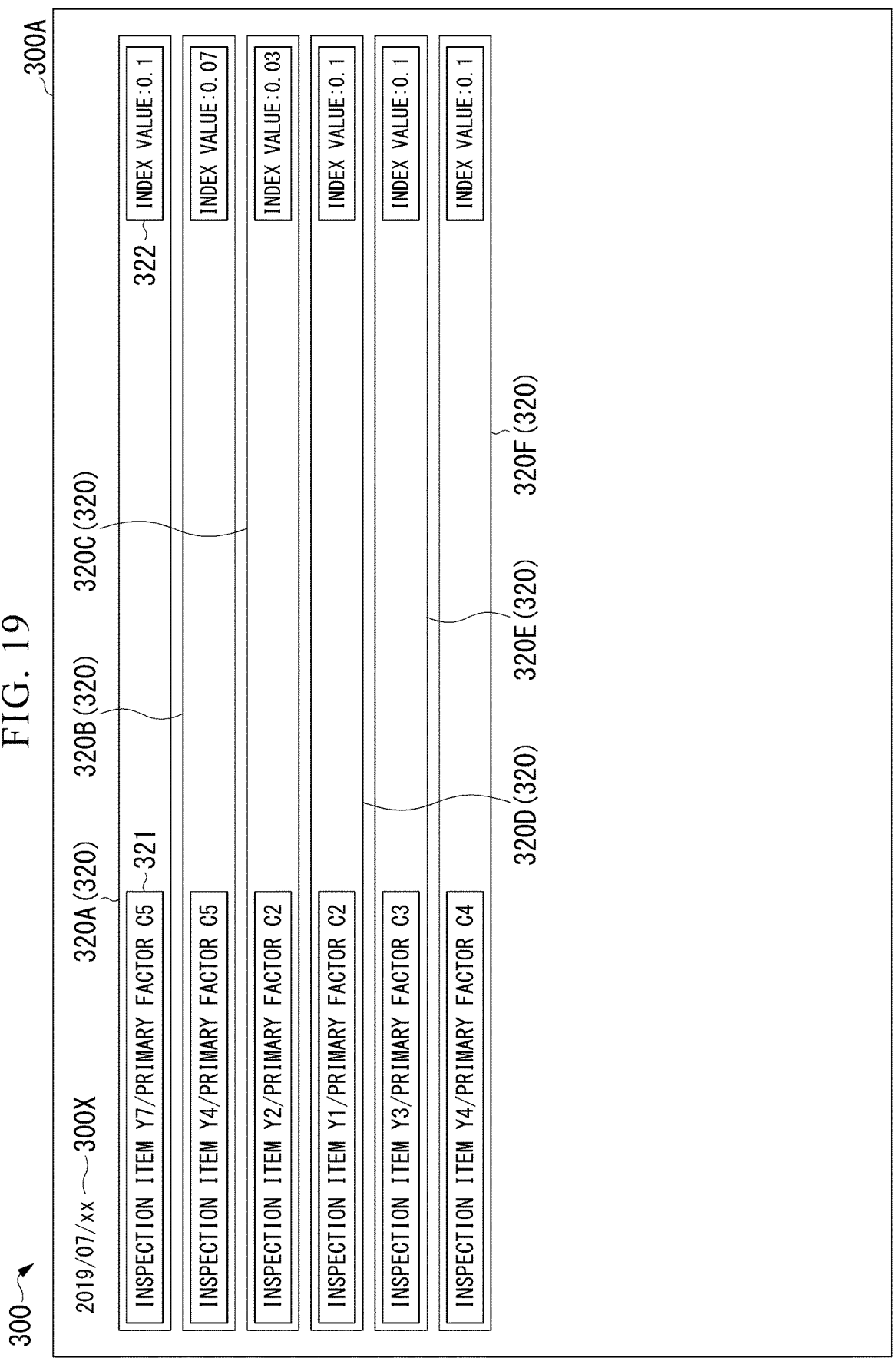
FIG. 19 is a diagram showing another example of a screen displayed on the display device according to the second embodiment.

As shown in FIG. 16, the second analyzer 244 of the analyzer 240 derives a second index value F(Cj). For example, the second index value F(Cj) is biased to a specific manufacturing condition of a product. The generator 260 sets a priority of the second image 320 including an image showing second analysis information G(Yi, Cj) on the basis of the second index value F(Cj) of the manufacturing condition data Cj derived by the second analyzer 244. The generator 260 generates visualized data according to the set priority of the first image 310 and outputs the visualized data to the display device 300. FIG. 19 is a diagram showing another example of a screen displayed on the display device 300 of the second embodiment. As shown in FIG. 19, in the visualized data generation system 2 of the first example of the second embodiment, for example, a plurality of second images 320 according to the priority set by the second index value F(Cj) are displayed on the display device 300. In the second image 320 (first- to sixth-stage second images 320A to 320F), a manufacturing condition name image 321 and a second index value image 322 are displayed. Also, the second analyzer 244 may derive a second index value F(Yi, Cj) representing the bias of products determined to be abnormal to a specific manufacturing condition, instead of the second index value F(Cj).

Fourth Example of Second Embodiment

Figure 20:
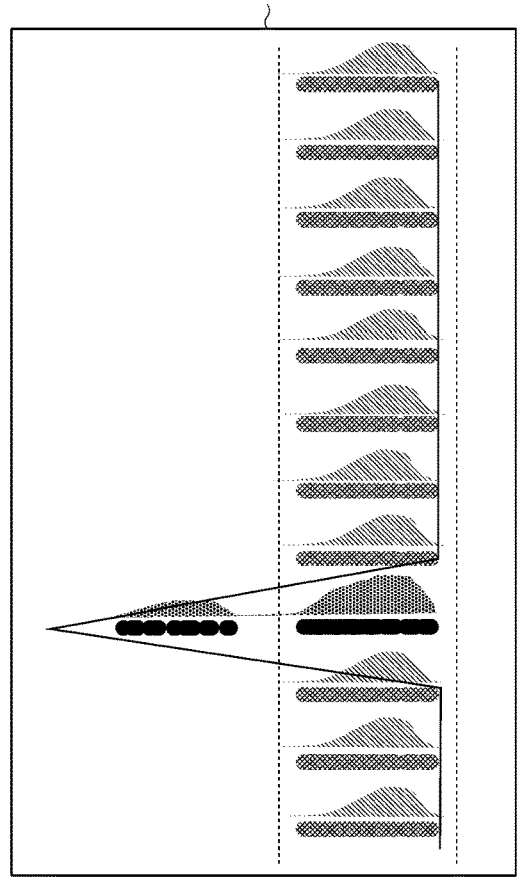
FIG. 20 is a diagram showing another example of a screen displayed on the display device according to the second embodiment.

Also, the second analyzer 244 of the analyzer 240 may derive a second index value F(Cj) and calculate second analysis information G(Cj). In this case, the generator 260 may set an amount of information and a priority of manufacturing condition data Cj on the basis of the second index value F(Cj). The generator 260 generates visualized data according to the set amount of information and the set priority of the second image 320 and outputs the visualized data to the display device 300. FIG. 20 is a diagram showing another example of a screen displayed on the display device 300 according to the second embodiment. As shown in FIG. 20, in the visualized data generation system 2 of the fourth example of the second embodiment, for example, a plurality of second images 320 according to the amount of information and the priority set by the second index value F(Cj) are displayed on the display device 300. A manufacturing condition name image 321 and a second index value image 322 are displayed in the second image 320 (first- to fourth-stage second images 320A to 320D), respectively. Also, in the first-stage second image 320A set to have a large amount of information, the second analysis information image 323 is also displayed.

Also, in the second embodiment, a form in which the combination of the first analyzer 242 and the second analyzer 244 or the combination of the manufacturing data Yi and the manufacturing condition data Cj is changed may be provided. For example, a configuration in which the analyzer 240 includes the first analyzer 242 and the second analyzer 244, the first analyzer 242 calculates the first index value F(Yi), and the second analyzer 244 calculates the second index value F(Cj) may be adopted. Also, either the first analyzer 242 or the second analyzer 244 may generate analysis information and the generated analysis information may be used by other components.

Third Embodiment

Figure 21:
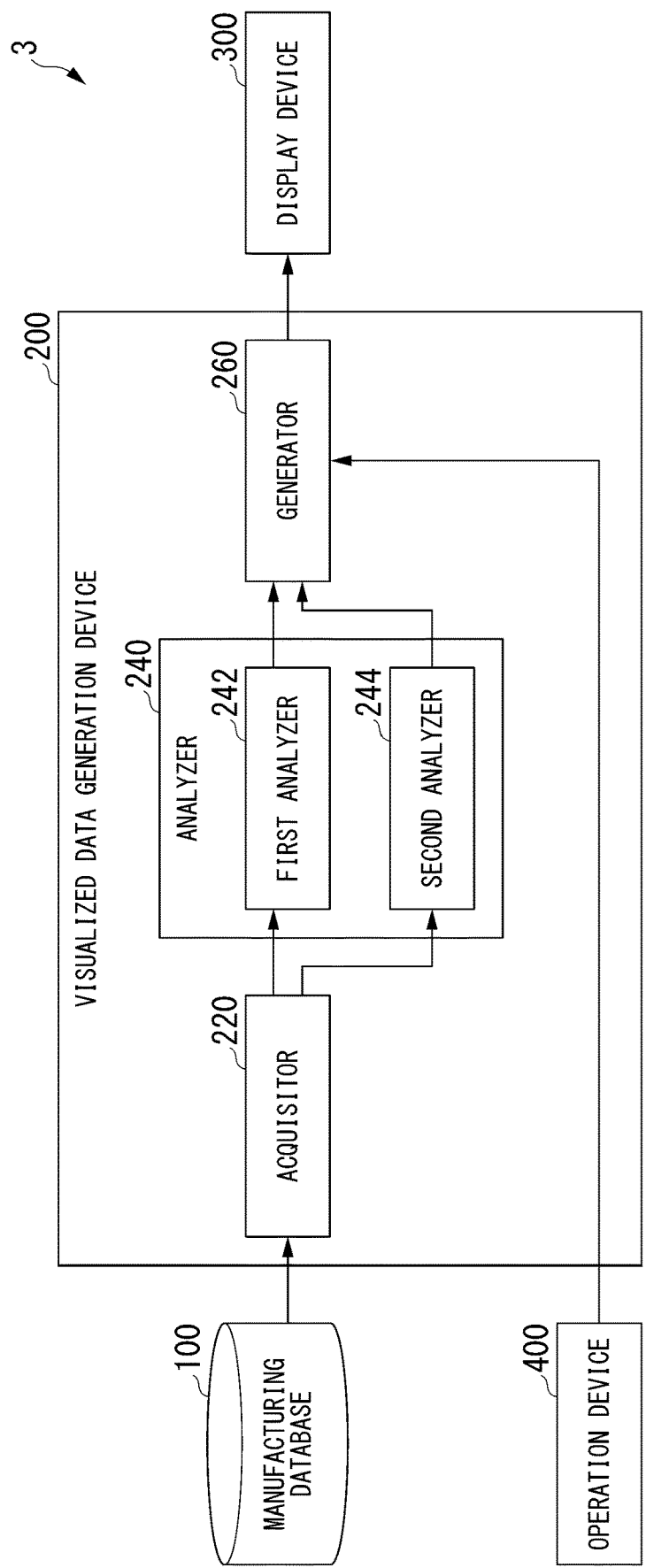
FIG. 21 is a block diagram showing a functional configuration of a visualized data generation system according to a third embodiment.

Next, a third embodiment will be described. FIG. 21 is a block diagram showing a functional configuration of a visualized data generation system 3 according to the third embodiment. As shown in FIG. 21, the visualized data generation system 3 of the third embodiment includes, for example, a manufacturing database 100, a visualized data generation device 200, a display device 300, and an operation device 400. The visualized data generation device 200 includes, for example, an acquisitor 220, an analyzer 240, and a generator 260.

The operation device 400 is, for example, a device that can be operated by a user such as an operator and that causes predetermined information to be input, for example, a mouse. The operation device may be a device other than the mouse, such as a keyboard or a joystick. Also, the display device 300 may be a touch panel and the display device 300 and the operation device 400 may be integrated. For example, the operation device 400 gives an instruction according to an image displayed on the display device 300 to the generator 260. The operation device 400 outputs instruction information according to the user's operation to the generator 260. The instruction information is information according to content of the instruction given to the generator 260. Hereinafter, the visualized data generation device 200 of the third embodiment will be described in a state in which description of parts similar to those of the visualized data generation device 200 of the first embodiment is omitted.

First Example of Third Embodiment

Figure 22:
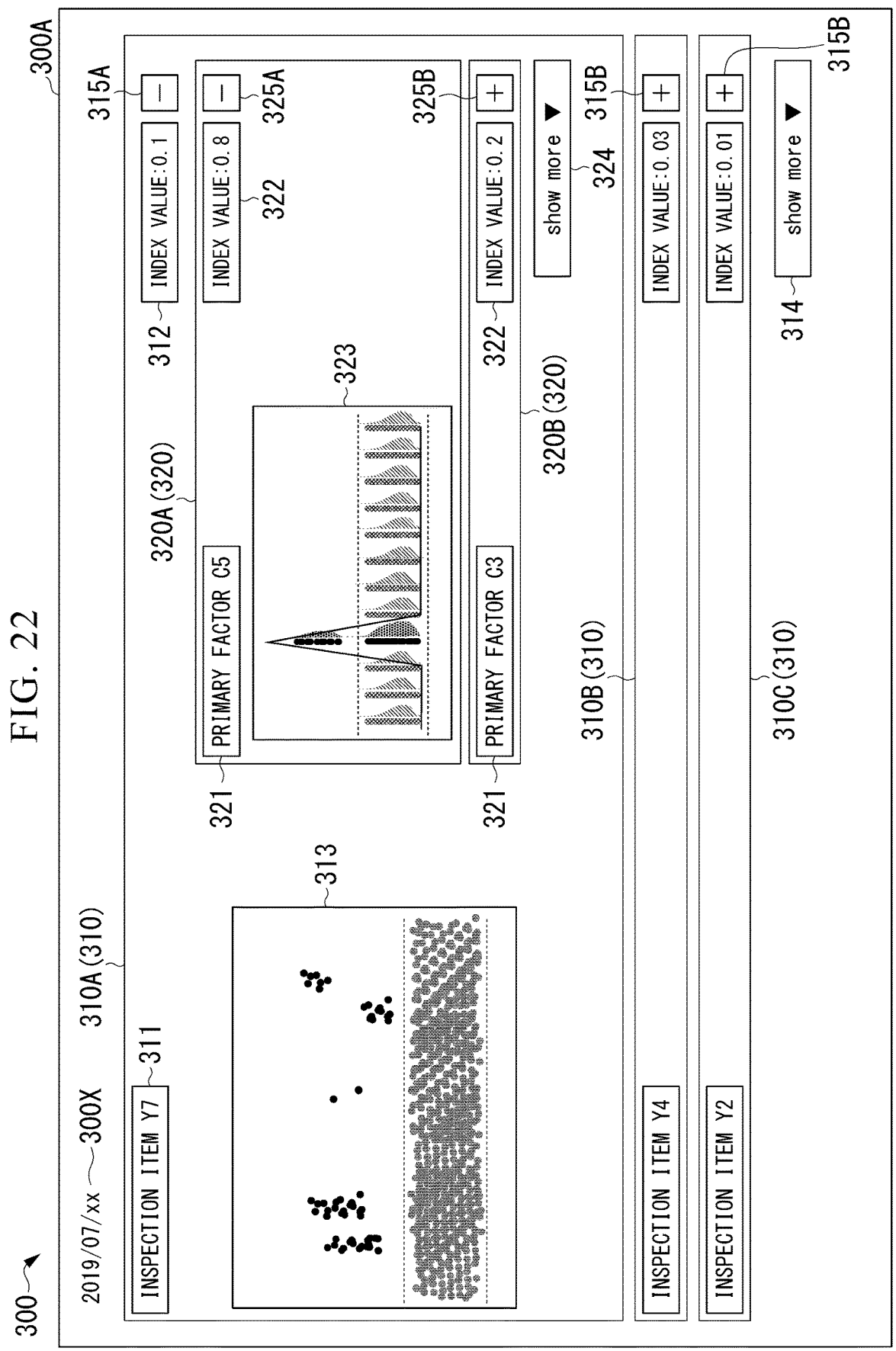
FIG. 22 is a diagram showing an example of a screen displayed on a display device according to the third embodiment.

FIG. 22 is a diagram showing an example of a screen displayed on the display device 300 according to the third embodiment. The generator 260 outputs operation information for causing a first display region display button 314 and a second display region display button 324 to be displayed on the screen 300A of the display device 300 or causing a first information amount decrease button 315A, a first information amount increase button 315B, a second information amount decrease button 325A, and a second information amount increase button 325B to be displayed or deleted to the display device 300. For example, the text "show more" is displayed on the first display region display button 314 and the second display region display button 324. A "−" symbol is displayed on the first information amount decrease button 315A and the second information amount decrease button 325A and a "+" symbol is displayed on the first information amount increase button 315B and the second information amount increase button 325B. The generator 260 generates operation information on the basis of the instruction information output by the operation device 400 and outputs the operation information to the display device 300.

The first image 310 and the second image 320 have an unfolded image and a folded image. In the example shown in FIG. 22, the first-stage first image 310A and the first-stage second image 320A are unfolded images and the second-stage first image 310B, the third-stage first image 310C, and the second-stage second image 320B are folded images. The first information amount decrease button 315A and the second information amount decrease button 325A are displayed on the unfolded image and the first information amount increase button 315B and the second information amount increase button 325B are displayed on the folded image. Also, the image may be reduced instead of or in addition to the form of the folded image. Also, the image may be enlarged instead of or in addition to the form of the unfolded image.

The visualized data generation system 3 of the third embodiment is different from the visualized data generation system 1 of the first embodiment in that content of the visualized data generated by the generator 260 is changed in accordance with instruction information output from the operation device 400. In more detail, the generator 260 changes amounts of information and display priorities of the first image 310 displayed in the first display region and the second image 320 displayed in the second display region on the basis of the instruction information output by the operation device 400 in accordance with an operation of the operation device 400 by the user and generates visualized data for adjusting display forms of the first image 310 and the second image 320.

The generator 260 causes a first display region display button 314 to be displayed on the lower right of the first image 310 in the screen 300A. For example, the generator 260 causes the screen 300A to display only the first image 310 for the manufacturing data Yi in which the first index value F(Yi) exceeds a predetermined display threshold value and hides the first image 310 for the manufacturing data Yi in which the first index value F(Yi) is less than or equal to the predetermined display threshold value. The first display region display button 314 is a button for increasing the number of first images 310 displayed on the screen 300A by displaying the first image 310 that has been hidden. For example, when the first display region display button 314 is operated, the generator 260 decreases the display threshold value, causes the hidden first image 310 to be displayed (unfolded), and increases the number of first images 310 to be displayed on the screen 300A. The operation device 400 is an example of an operation unit and an operation of clicking a mouse in a state in which a predetermined button has been designated is an example of an operation of the operation unit by a user. Also, in the following description, the button operation means, for example, that the mouse is clicked while a cursor (a pointer) is positioned on the button.

Also, the generator 260 may be configured to display the first image 310 in the folded state immediately after the first display region display button 314 is operated, or may be configured to display all hidden first images 310 when the first display region display button 314 is operated. Also, the generator 260 may be configured to sequentially display a predetermined number of first images 310 when the first display region display button 314 is operated. Also, the generator 260 may be configured so that the number of first images 310 to be displayed on the screen 300A is increased when the first display region display button 314 is operated and the displayed first image 310 is returned to the hidden form when a first display region hide button is displayed and the first display region hide button is operated.

The generator 260 causes the second display region display button 324 to be displayed on the lower right of the second image 320 in the first image 310. For example, it is assumed that, when the generator 260 causes the second image 320 to be displayed in the first image 310, only the second image 320 for the manufacturing data Yi and the manufacturing condition data Cj in which the second index value F(Yi, Cj) exceeds the predetermined display threshold value is displayed within the first image 310 and the second image for the manufacturing data Yi and the manufacturing condition data Cj in which the second index value F(Yi, Cj) is less than or equal to the predetermined display threshold value is hidden. The second display region display button 324 is a button for increasing the number of second images 320 to be displayed in the first image 310 by displaying the second image 320 that has been hidden. A relationship between the second image 320 and the second display region display button 324 is similar to a relationship between the first image 310 and the first display region display button 314.

For example, a first information amount decrease button 315A is displayed on the right side of the first index value image 312 in an upper right portion of the unfolded image, for example, the first-stage first image 310A, among the first images 310. The first information amount decrease button 315A is a button for decreasing the amount of information to be displayed on the first image 310. For example, when the first information amount decrease button 315A of the first-stage first image 310A in the unfolded state is operated, the first-stage first image 310A changes from the unfolded state to the folded state and an amount of information to be displayed on the first-stage first image 310A is decreased.

A first information amount increase button 315B is displayed on the right side of the first index value image 312 in a right portion of the folded image, for example, the second-stage first image 310B, among the first images 310. The first information amount increase button 315B is a button for increasing the amount of information to be displayed on the first image 310. For example, when the first information amount decrease button 315A in the second-stage first image 310B in the folded state is operated, the second-stage first image 310B changes from the folded state to the unfolded state and the amount of information to be displayed on the second-stage first image 310B is increased.

Figure 23:
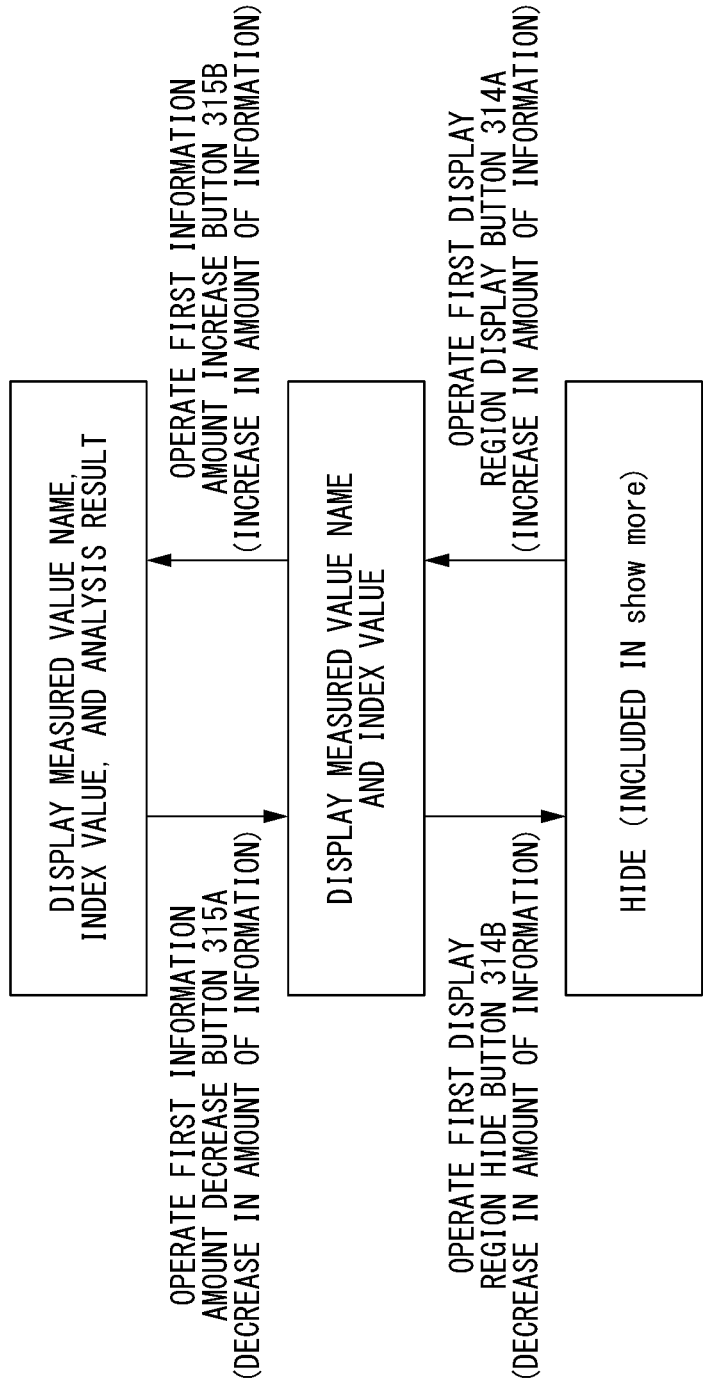
FIG. 23 is a diagram showing the transition of a display form of a first image according to the third embodiment.

FIG. 23 is a diagram showing the transition of the display form of the first image 310 according to the third embodiment. For example, the measured value (the measured value name image 311), the index value (the first index value image 312), and the analysis result (the first analysis information image 313) are displayed on the unfolded image among the first images 310. In this state, when the first information amount decrease button 315A is operated, the first image 310 becomes a folded image and a state in which the amount of information of the first image 310 decreases and the measured value name (the measured value name image 311) and the index value (the first index value image 312) are displayed is reached as shown in FIG. 23.

Figure 24:
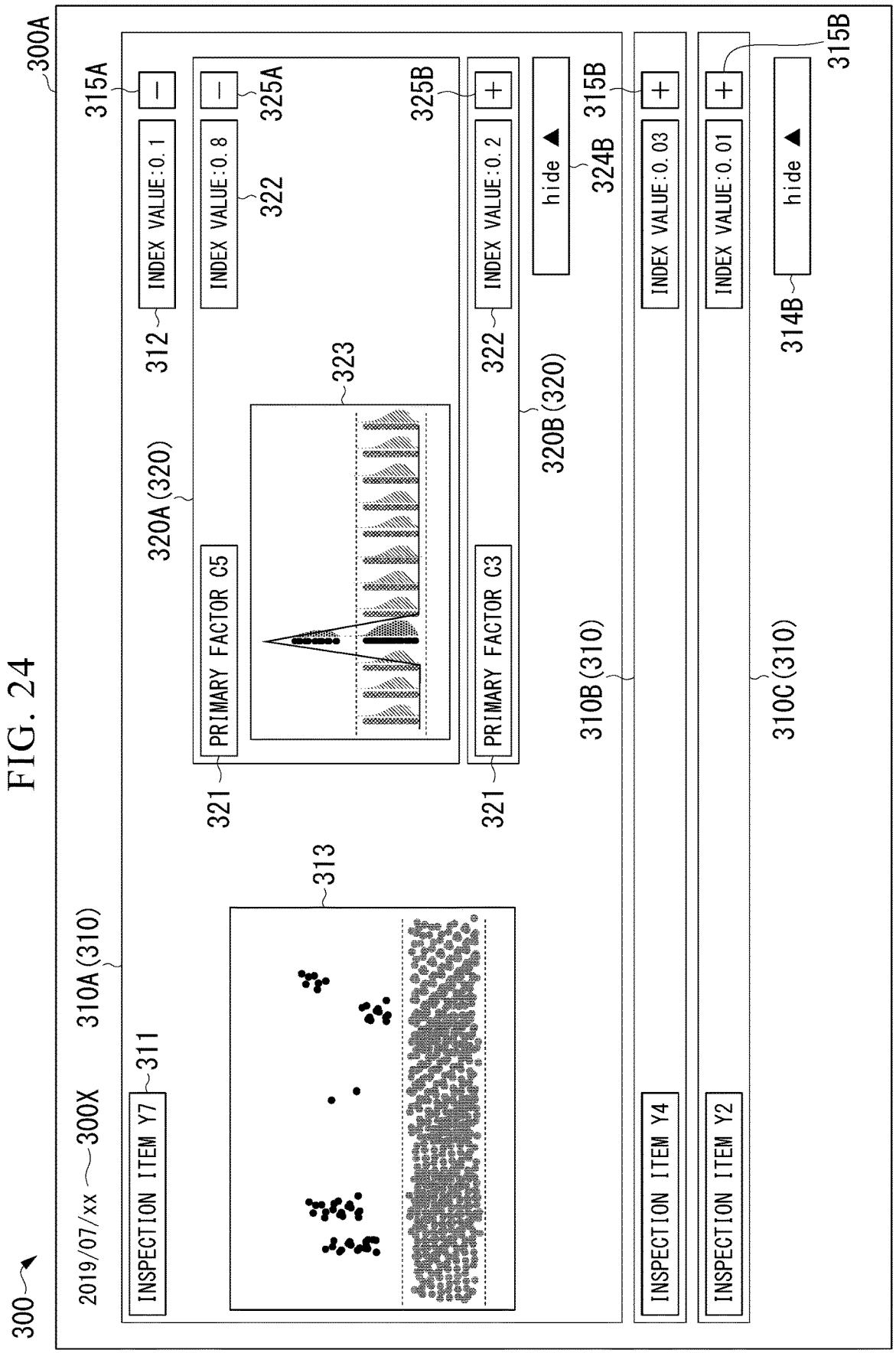
FIG. 24 is a diagram showing another example of a screen displayed on the display device according to the third embodiment.

Also, in the image displayed on the display device 300, a first display region hide button 314B may be displayed as shown in FIG. 24 instead of the first display region display button 314 shown in FIG. 22. For example, when the first display region hide button 314B is operated, a part of the information displayed on the first image 310 is hidden and the amount of information displayed on the first image 310 is reduced in the hidden state as shown in FIG. 23. Even if the first display region hide button 314B is displayed instead of the first display region display button 314, the folded image is displayed and the number of first images 310 to be displayed is increased or the amount of information to be displayed on the first image 310 may be further reduced in the hidden state, for example, when a certain time period has elapsed. Also, both the first display region display button 314 and the first display region hide button 314B may be displayed.

Also, when the first display region display button 314 is operated, a state in which the amount of information of the first image 310 in the hidden state increases and the measured value name (the measured value name image 311) and the index value (the first index value image 312) are displayed in the folded image is reached. When the first information amount increase button 315B is operated in this state, the amount of information of the first image 310 further increases and the measured value name image 311, the first index value image 312, and the first analysis information image 313 are displayed in the unfolded image.

A second information amount decrease button 325A is displayed on the right side of the second index value image 322 in an upper right portion of the unfolded image, for example, the first-stage second image 320A, among the second images 320. The second information amount decrease button 325A is a button for decreasing the amount of information to be displayed on the second image 320. For example, when the second information amount decrease button 325A in the first-stage second image 320A in the unfolded state is operated, the first-stage second image 320A changes from the unfolded state to the folded state and the amount of information to be displayed on the first-stage second image 320A is reduced.

A second information amount increase button 325B is displayed on the right side of the second index value image 322 in a right portion of the folded image, for example, the second-stage second image 320B, among the second images 320. The second information amount increase button 325B is a button for increasing the amount of information to be displayed on the second image 320. For example, when the second information amount decrease button 325A in the second-stage second image 320B in the folded state is operated, the second-stage second image 320B changes from the folded state to the unfolded state and an amount of information to be displayed on the second-stage second image 320B is increased. Also, instead of the second display region display button 324 shown in FIG. 22, a second display region decrease button 324B may be displayed as shown in FIG. 24 or both the second display region display button 324 and the second display region decrease button 324B may be displayed.

In this manner, the first image 310 and the second image 320 may be unfolded images or folded images or the amount of information may be adjusted. Also, these displays may be selectable by the user. In this case, because the user can easily see the image, it is possible to further avoid overlooking of an abnormality in a product.

Also, when the first information amount decrease button 315A or the second information amount decrease button 325A is operated and the amount of information of the displayed information changes (decreases), the amount of information to be changed and the content of the information are displayed and the user may be notified thereof. Likewise, when the first information amount increase button 315B or the second information amount increase button 325B is operated and an amount of information to be displayed changes (increases), the amount of information to be changed and the content of the information are displayed and the user may be notified thereof.

Second Example of Third Embodiment

The generator 260 may cause the screen 300A of the display device 300 to display an image (an interface) for receiving a priority change operation of the first image 310. Although a radio button will be described as an example of an image which becomes an interface in the second example of the third embodiment, the image which becomes the interface may be a check box, a pull-down menu, or the like.

Figure 25:
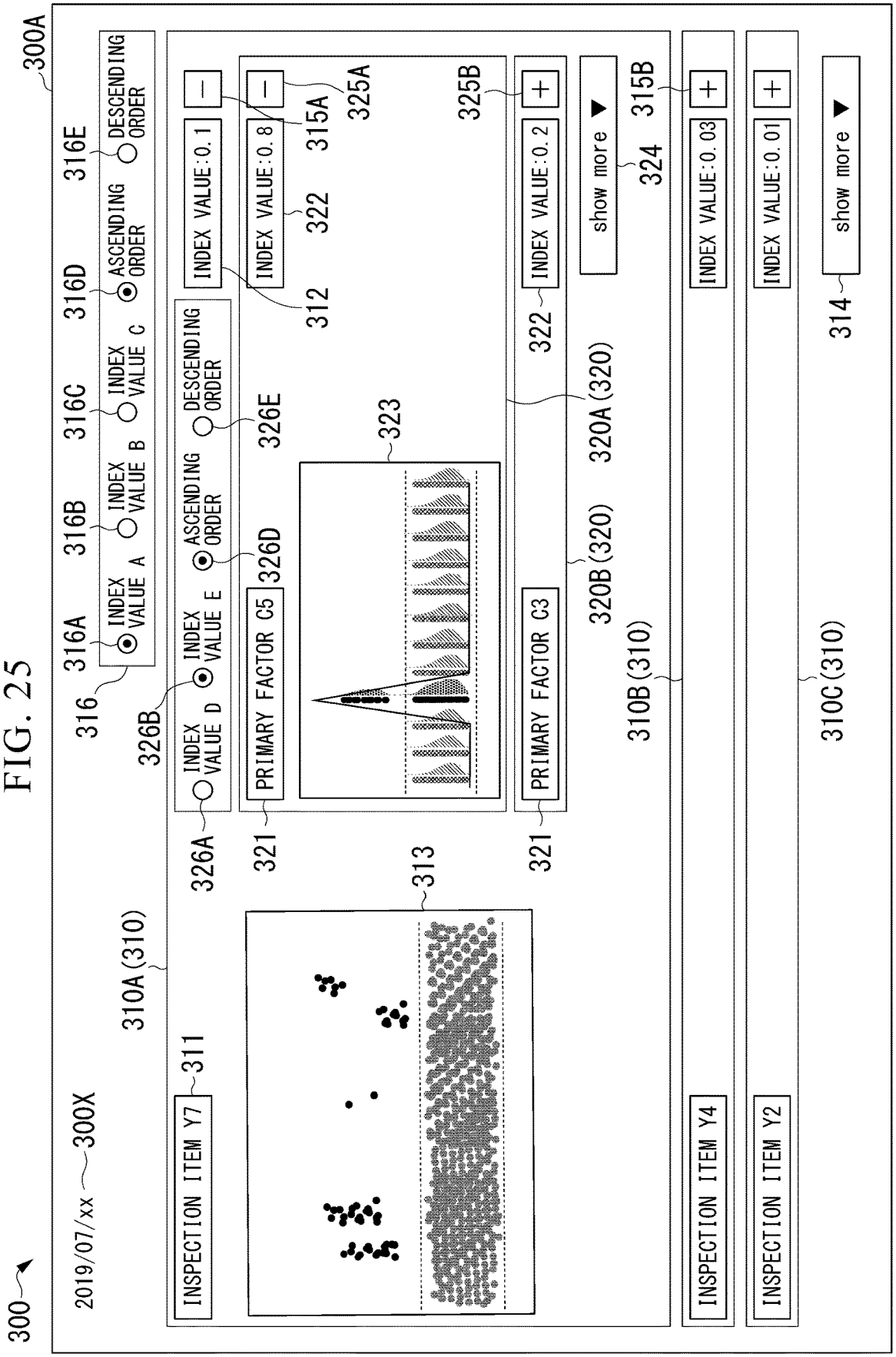
FIG. 25 is a diagram showing another example of a screen displayed on the display device according to the third embodiment.

FIG. 25 is a diagram showing another example of a screen displayed on the display device 300 according to the third embodiment. The generator 260 outputs operation information for causing the screen 300A of the display device 300 to display a first index value selection image 316 and a second index value selection image 326 to the display device 300. The first index value selection image 316 includes an index value A button 316A, an index value B button 316B, an index value C button 316C, an ascending order button 316D, and a descending order button 316E. The second index value selection image 326 includes an index value D button 326A, an index value E button 326B, an ascending order button 326D, and a descending order button 326E.

An index value A, an index value B, and an index value C are all index values that become display threshold values for causing the screen 300A to display the first image 310 for the manufacturing data Yi. The index value A is a value greater than the index value B. The index value B is a value greater than the index value C. The index value D and the index value E are both index values that become display threshold values for causing the second image 320 for the manufacturing data Yi and the manufacturing condition data Cj to be displayed in the first image 310. The index value D is a value greater than the index value E.

It is possible to mutually designate one of the index value A button 316A, the index value B button 316B, and the index value C button 316C. For example, when the index value A button 316A is operated and designated, the generator 260 sets the index value A as an index value that becomes a display threshold value for causing the screen 300A to display the first image 310 for the manufacturing data Yi and outputs operation information for causing the screen 300A to display the first image 310 for the manufacturing data Yi in which the first index value F(Yi) is greater than the index value A to the display device 300. Also, the generator 260 sets the index value B as the index value when the index value B button 316B is operated and designated and sets the index value C as the index value when the index value C button 316C is operated and designated. The index value that becomes a display threshold value for causing the screen 300A to display the first image 310 for the manufacturing data Yi is set through selection from the index value A, the index value B, and the index value C.

Also, it is possible to mutually designate one of the ascending order button 316D and the descending order button 316E. The generator 260 causes the first images 310 to be sequentially displayed side by side from top to bottom in a direction from the smallest index value to the largest index value when the ascending order button 316D is operated and designated and causes the first images 310 to be sequentially displayed side by side from top to bottom in a direction from the largest index value to the smallest index value when the descending order button 316E is operated and designated. One of the ascending order button 316D and the descending order button 316E is selected.

Also, it is possible to mutually designate one of the index value D button 326A and the index value E button 326C. When the index value D button 326A is operated and designated, the generator 260 sets the index value D as an index value that becomes a display threshold value for causing the second image 320 for the manufacturing data Vi and the manufacturing condition data Cj to be displayed on the first image 310 and outputs operation information for causing the second image 320 for the manufacturing data Yi and the manufacturing condition data Cj in which the second index value F(Yi, Cj) is larger than the index value D to be displayed on the first image 310 to the display device 300. When the index value E button 326B is operated and designated, the generator 260 sets the index value E as the index value. The index value that becomes a display threshold value for causing the second image 320 for the manufacturing data Vi and the manufacturing condition data Cj to be displayed in the first image 310 is set through selection from the index value D and the index value E.

Also, it is possible to mutually designate one of the ascending order button 326D and the descending order button 326E. The generator 260 causes the second images 320 to be sequentially displayed side by side from top to bottom in a direction from the smallest index value to the largest index value when the ascending order button 326D is operated and designated and causes the second images 320 to be sequentially displayed side by side from top to bottom in a direction from the largest index value to the smallest index value when the descending order button 326E is operated and designated. One of the ascending order button 326D and the descending order button 326E is selected.

In this manner, the index value A button 316A, the index value B button 316B, the index value C button 316C, the ascending order button 316D, and the descending order button 316E are displayed on the screen 300A of the display device 300 and the user can determine (select) an index value for displaying the first image 310 and the second image 320 or set the display order thereof. In this case, because the user can easily see the image, it is possible to further avoid overlooking of an abnormality in a product and the like.

Third Example of Third Embodiment

Figure 26:
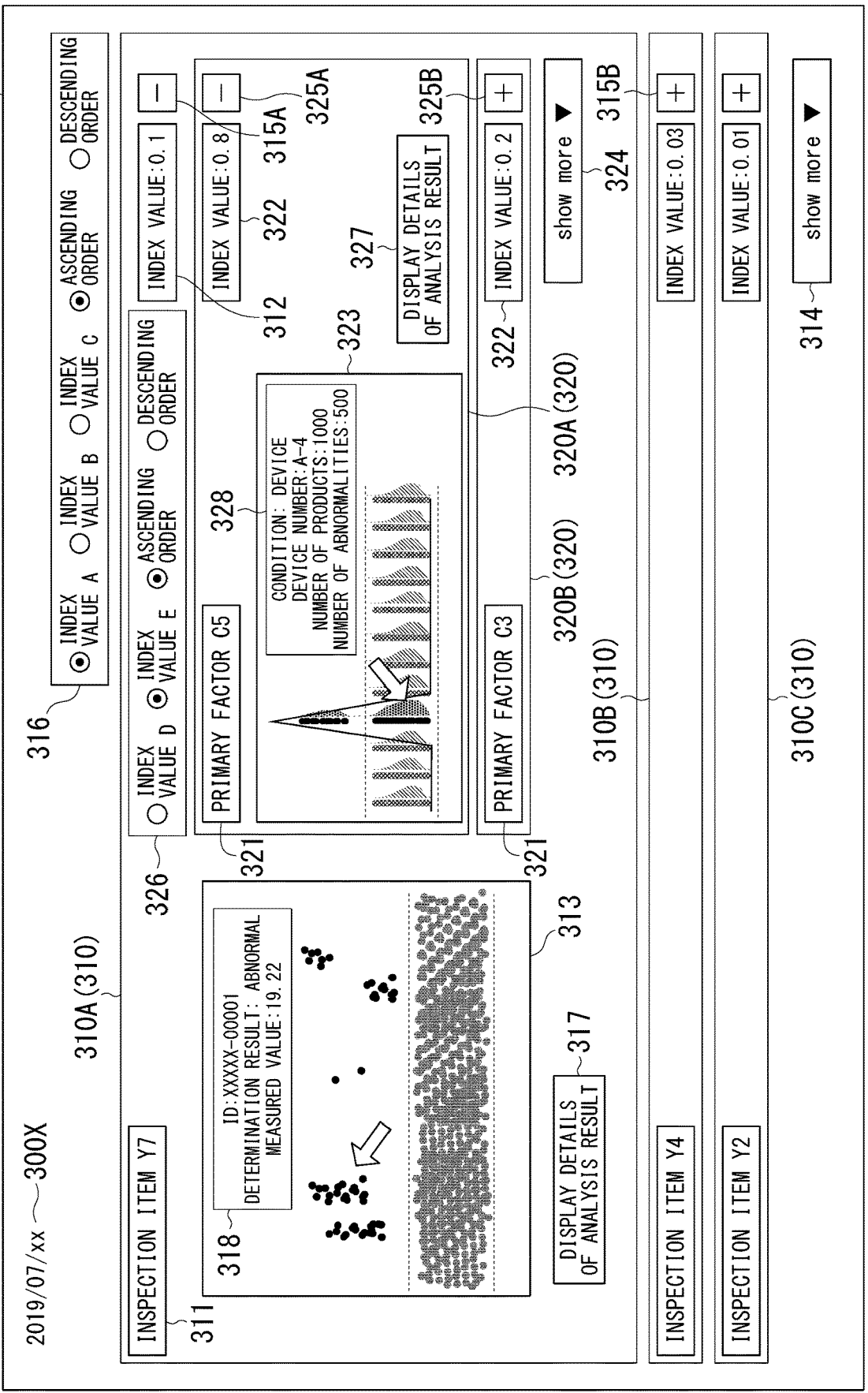
FIG. 26 is a diagram showing another example of a screen displayed on the display device according to the third embodiment.

The generator 260 causes the cursor displayed on the screen 300A of the display device 300 to be aligned with one of analysis results displayed in the first display region, so that details of the analysis result with which the cursor is aligned are displayed. FIG. 26 is a diagram showing another example of a screen displayed on the display device 300 according to the third embodiment. The generator 260 causes a first detailed display request image 317 to be displayed below a first analysis information image 313 and causes a second detailed display request image 327 to be displayed on the side of a second analysis information image 323 in the first image 310, for example, the first-stage first image 310A. The generator 260 may cause the first detailed display request image 317 and the second detailed display request image 327 to be displayed at other positions.

The generator 260 performs switching between ON and OFF of a first detailed image display mode by operating the first detailed display request image 317. When the cursor is aligned with one of the analysis results in the first image 310 when the first detailed image display mode is turned on, the generator 260 causes a first detailed image 318 on which details of the analysis result aligned with the cursor are displayed to be displayed inside the first analysis information image 313. The first detailed image 318 includes an ID of a product, a determination result, a measured value, and the like corresponding to the analysis result.

The generator 260 performs switching between ON and OFF of a second detailed image display mode by operating the second detailed display request image 327. If the cursor is aligned with one of the analysis results in the second image 320 when the second detailed image display mode is turned on, the generator 260 causes a second detailed image 328 on which details of the analysis result with which the cursor is aligned are displayed to be displayed inside the second analysis information image 323. The second detailed image 328 includes a manufacturing condition of a product corresponding to an analysis result, a device number of a device that manufactured the product, the number of products, the number of abnormalities that occurred, and the like.

In this manner, it is possible to present details of a situation such as an abnormality in a product to the user by displaying the first detailed image 318 and the second detailed image 328. Further, the first detailed display request image 317 and the second detailed display request image 327 can be displayed and it is possible to select whether or not to display the first detailed image 318 and the second detailed image 328, so that it is possible to provide information according to a desire of the user.

In the third embodiment, the user can change amounts of information and priorities of the first image 310 and the second image 320 through the operation device 400. Thereby, the user can not only preferentially monitor the manufacturing data that is expected to have a high relationship with the abnormality, but also can confirm the analysis results multilaterally. For example, in daily monitoring work, it is possible to provide a method of confirming the manufacturing data that is expected to have a high relationship with the abnormality which is first displayed and monitoring items having a relatively low relationship with the abnormality in a situation in which detailed monitoring is required.

Also, if a plurality of analysis results have been generated, a button for displaying the details of the analysis results may be provided separately and a plurality of analysis results may be displayed when each button is operated. As an example of the change by another operation, a threshold value for the index value may be changed or the display order may be arbitrarily rearranged according to an operation. Also, the measured value name may be designated to change an amount of information, a display state, a priority, and the like.

Fourth Example of Third Embodiment

Figure 27:
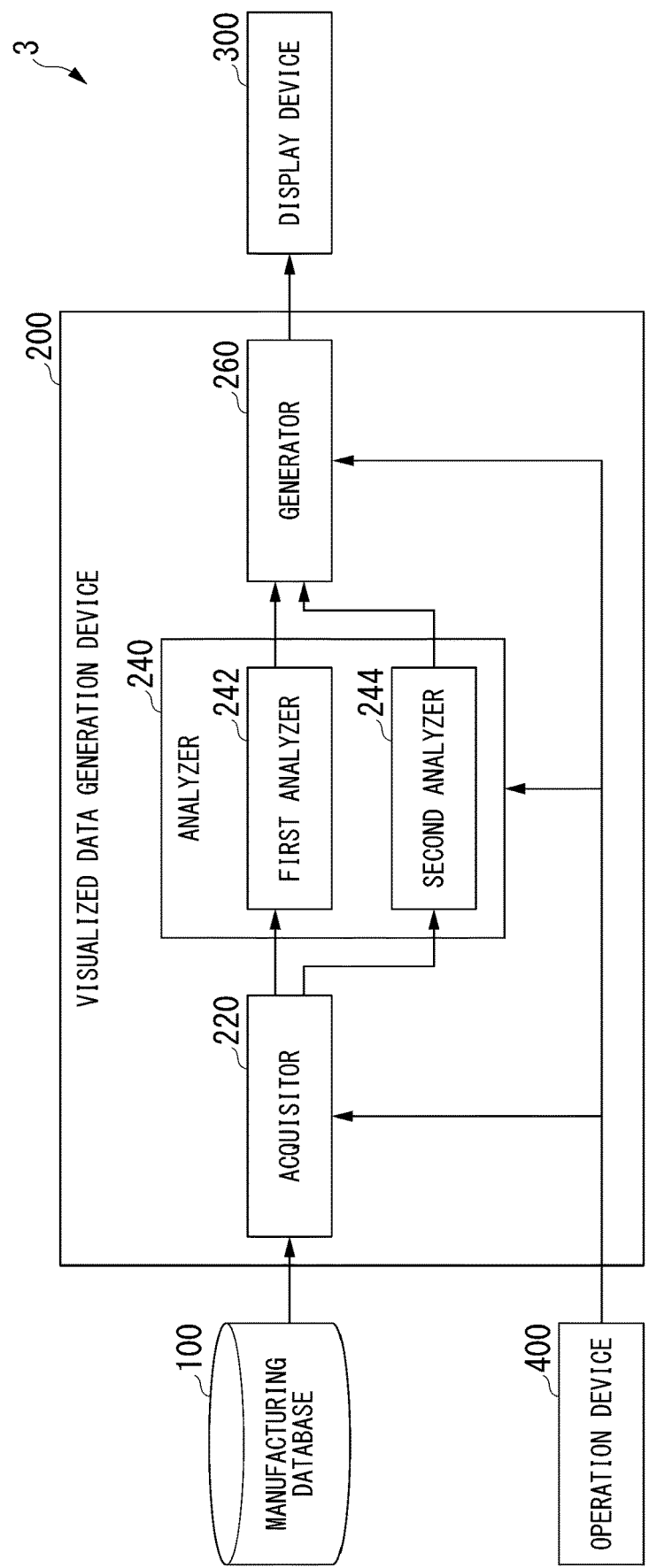
FIG. 27 is a block diagram showing a functional configuration of a visualized data generation system according to the third embodiment.

FIG. 27 is a block diagram showing another functional configuration of the visualized data generation system 3 according to the third embodiment. As shown in FIG. 27, for example, the operation device 400 of the visualized data generation system 3 according to the third embodiment gives an instruction according to an image displayed on the display device 300 to at least one of the acquisitor 220, the analyzer 240, and the generator 260. The operation device 400 outputs instruction information according to the user's operation to at least one of the acquisitor 220, the analyzer 240, and the generator 260. The instruction information is information according to content of the instruction given to at least one of the acquisitor 220, the analyzer 240, and the generator 260.

The acquisitor 220 may set, for example, a type and the number of pieces of data to be acquired and a data acquisition range on the basis of the given instruction information. For example, the analyzer 240 may set an analysis method on the basis of the given instruction information. For example, a type or a derivation method of an index value to be derived may be changed. For example, a type and a derivation method of analysis information to be derived may be set. For example, when the instruction information is given to the acquisitor 220 and a type and the number of pieces of data to be acquired and the data acquisition range are set, the acquisitor 220 may acquire data again, the analyzer 240 may perform analysis again, and the generator 260 may generate visualized data again. For example, when the instruction information is given to the analyzer 240 and the analysis method is set, the analyzer 240 may perform analysis again, and the generator 260 may generate visualized data again.

For example, the visualized data generation device may generate visualized data including information for notifying the user that a change regarding the content of the instruction included in the instruction information has occurred using at least one of the acquisitor 220, the analyzer 240, and the generator 260.

Fourth Embodiment

Figure 28:
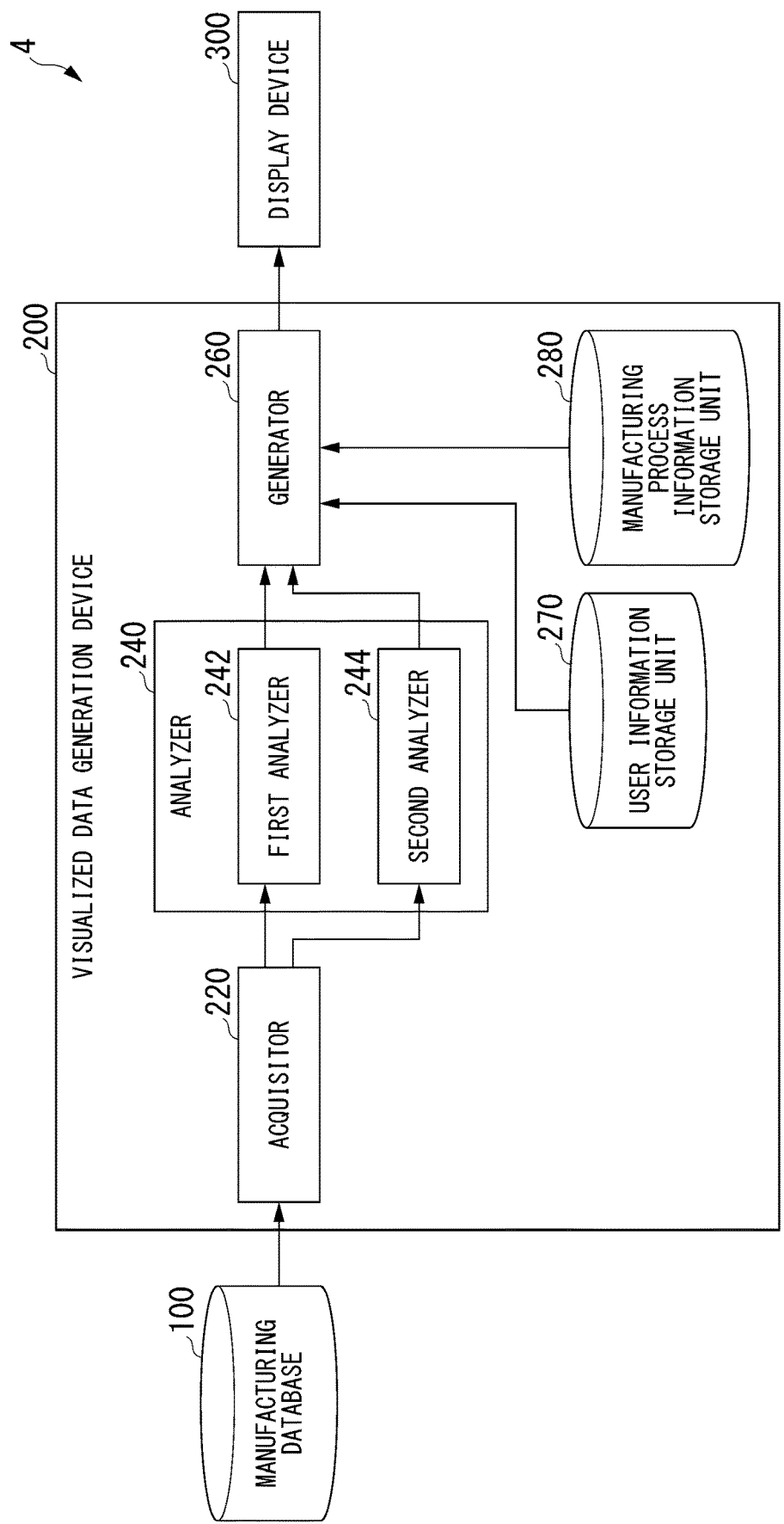
FIG. 28 is a block diagram showing a functional configuration of a visualized data generation system according to a fourth embodiment.

Next, a fourth embodiment will be described. FIG. 28 is a block diagram showing a functional configuration of a visualized data generation system 4 according to the fourth embodiment. As shown in FIG. 28, the visualized data generation system 4 of the fourth embodiment includes, for example, a manufacturing database 100, a visualized data generation device 200, a display device 300, and an operation device 400. The visualized data generation device 200 includes, for example, an acquisitor 220, an analyzer 240, a generator 260, a manufacturing process information storage unit 270, and a user information storage unit 280. In the fourth embodiment, the generator 260 generates visualized data in accordance with the manufacturing process information storage unit 270 and the user information storage unit 280 with respect to the third embodiment. Hereinafter, the visualized data generation device 200 of the fourth embodiment will be described in a state in which description of parts similar to those of the visualized data generation device 200 of the first embodiment is omitted.

The manufacturing process information storage unit 270 is information about a product manufacturing process. The manufacturing process is, for example, a subdivided work step for completing the final commercialization. Usually, manufacturing data Yi is also recorded for each manufacturing process. In the manufacturing process information storage unit 270, the manufacturing data Yi acquired by the acquisitor 220 includes a product state according to the manufacturing process and which item of the manufacturing data Yi belongs to which manufacturing process, in other words, which item of the manufacturing data Yi has been manufactured in which manufacturing process, is represented. FIG. 29 is a diagram showing an example of manufacturing data and manufacturing condition data including the manufacturing process acquired by the acquisitor 220 according to the fourth embodiment. For example, an item C_1 and an item C_2 belong to a process A and an item C_3 belongs to a process B. The generator 260 generates visualized data using the manufacturing process information in addition to the first index value F(Yi) and the second index value F(Yi, Cj).

The user information storage unit 280 stores user information as data in which a displayed state and a hidden state of each predetermined item are set for each user. The predetermined item may be any item or may be, for example, a measured value or a manufacturing process. FIG. 30 is a diagram showing an example of manufacturing data including a manufacturing process and user information and manufacturing condition data acquired by the acquisitor 220 according to the fourth embodiment. In FIG. 30, the displayed state is represented by "O" and the hidden state is represented by "-".

In the example shown in FIG. 30, whether to display or hide the information for each process is set for each user. For example, a first half and a second half of the process A and a process B are displayed for a user 1 and a user 3 and hidden for a user 2. A first half of a process C is displayed for the users 2 and 3 and hidden for the user 1 and a second half of the process C is displayed for the users 1 and 2 and hidden for the user 3.

The user information storage unit 280 stores user information including data in which a numerical value (a display level) is set for each user. For example, an analysis result regarding some manufacturing data Yi is displayed for the user having a low level. On the other hand, an analysis result of a large number of pieces of manufacturing data Yi is displayed for the user having a high level. The display level is set to be low for inexperienced persons and is set to be high for experienced persons and managers.

Figure 31:
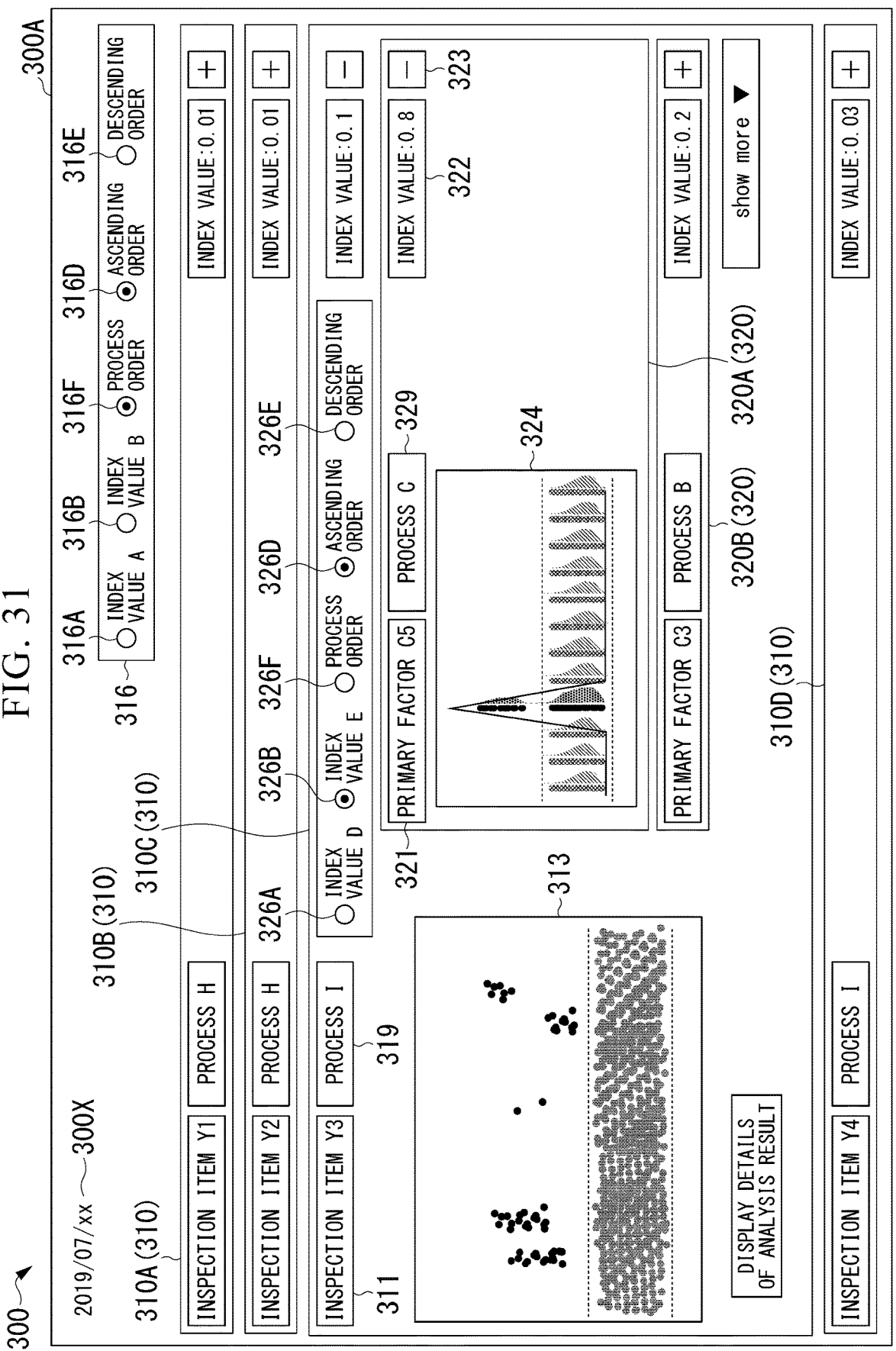
FIG. 31 is a diagram showing an example of a screen displayed on a display device according to the fourth embodiment.

FIG. 31 is a diagram showing an example of a screen displayed on the display device 300 according to the fourth embodiment. The generator 260 causes the screen 300A of the display device 300 to display a first process image 319 in a first image 310 and to display a second process image 329 in a second image 320. In the first image 310, the first process image 319 is displayed, for example, both when the first image 310 is in the unfolded state and when the first image 310 is in the folded state. Likewise, in the second image 320, the second process image 329 is displayed both when the second image 320 is in the unfolded state and when the second image 320 is in the folded state. The first process image 319 may be displayed when the first image 310 is in the unfolded state and may not be displayed when the first image 310 is in the folded state. The second process image 329 may be displayed when the second image 320 is in the unfolded state, and may not be displayed when the second image 320 is in the folded state.

In the display device 300 of the fourth embodiment, the first index value selection image 316 includes a process order button 316F in addition to an index value A button 316A, an index value B button 316B, an ascending order button 316D, and a descending order button 316E. In the second index value selection image 326, a process order button 326F is displayed in addition to an index value D button 326A, an index value E button 326B, an ascending order button 326D, and a descending order button 326E.

The process order button 316F can be designated with one of the index value A button 316A and the index value B button 316B. When the process order button 316F is operated and designated, the generator 260 causes the first images 310 to be displayed side by side from top to bottom in the process order. When the ascending order button 316D is operated together with the process order button 316F, the generator 260 causes the first images 310 to be sequentially displayed side by side from top to bottom in a direction from the fastest process to the slowest process. When the descending order button 316E is operated together with the process order button 316F, the generator 260 causes the first images 310 to be sequentially displayed side by side from top to bottom in a direction from the slowest process to the fastest process.

The process order button 326F can be designated with one of the index value D button 326A and the index value E button 326B. When the process order button 326F is operated and designated, the generator 260 causes the second images 320 to be displayed side by side from top to bottom in the process order. When the ascending order button 326D is operated together with the process order button 326F, the generator 260 causes the second images 320 to be sequentially displayed side by side from top to bottom in a direction from the fastest process to the slowest process. When the descending order button 326E is operated together with the process order button 326F, the generator 260 displays the second images 320 to be sequentially displayed side by side from top to bottom in a direction from the slowest process to the fastest process.

Also, the first images 310 and the second images 320 may be displayed in the order of index values, as in the first to third embodiments. Also, when the first images 310 and the second images 320 are displayed in the process order, the first images 310 may be displayed without being hidden. In other words, the state of the first images 310 may be changed from the hidden state to the displayed state. Also, in each process, a predetermined number of first images 310 may be displayed in the descending order of first index values F(Yi). Also, when the first images 310 and the second images 320 are displayed in the process order, the number of displayed first images 310 may be larger than that when the first image 310 and the second image 320 are displayed in the order of index values or the first images 310 may be displayed for all processes.

Also, when the operation device 400 (see FIG. 21) is provided, an interface for switching the priority between the order of index values and the process order according to the operation of the operation device 400 may be provided. Also, a threshold value for the index value may be set for each process. In this case, in particular, the occurrence of the abnormality can be displayed in an easy-to-understand manner by changing the threshold value between the process in which the abnormality is likely to occur and the process in which the abnormality is unlikely to occur.

Also, it is assumed that there are various users who use the visualized data generation device 200. For example, the users are assumed to be an operator of each manufacturing process, a staff member of each manufacturing process, a staff member who manages the entire manufacturing process, and the like. In the visualized data generation device 200 of the fourth embodiment, content of the visualized data is changed in accordance with an attribute of the user.

Because visualized data can be generated in consideration of not only the index value but also the information of the manufacturing process in the visualized data generation device 200 of the fourth embodiment, the analysis result is displayed in manufacturing process order and display can be implemented so that the user can easily perform monitoring. Also, it is possible to implement display according to a monitoring target and a skill level of the user to use and reduce the burden on the user using user information.

Fifth Embodiment

Figure 32:
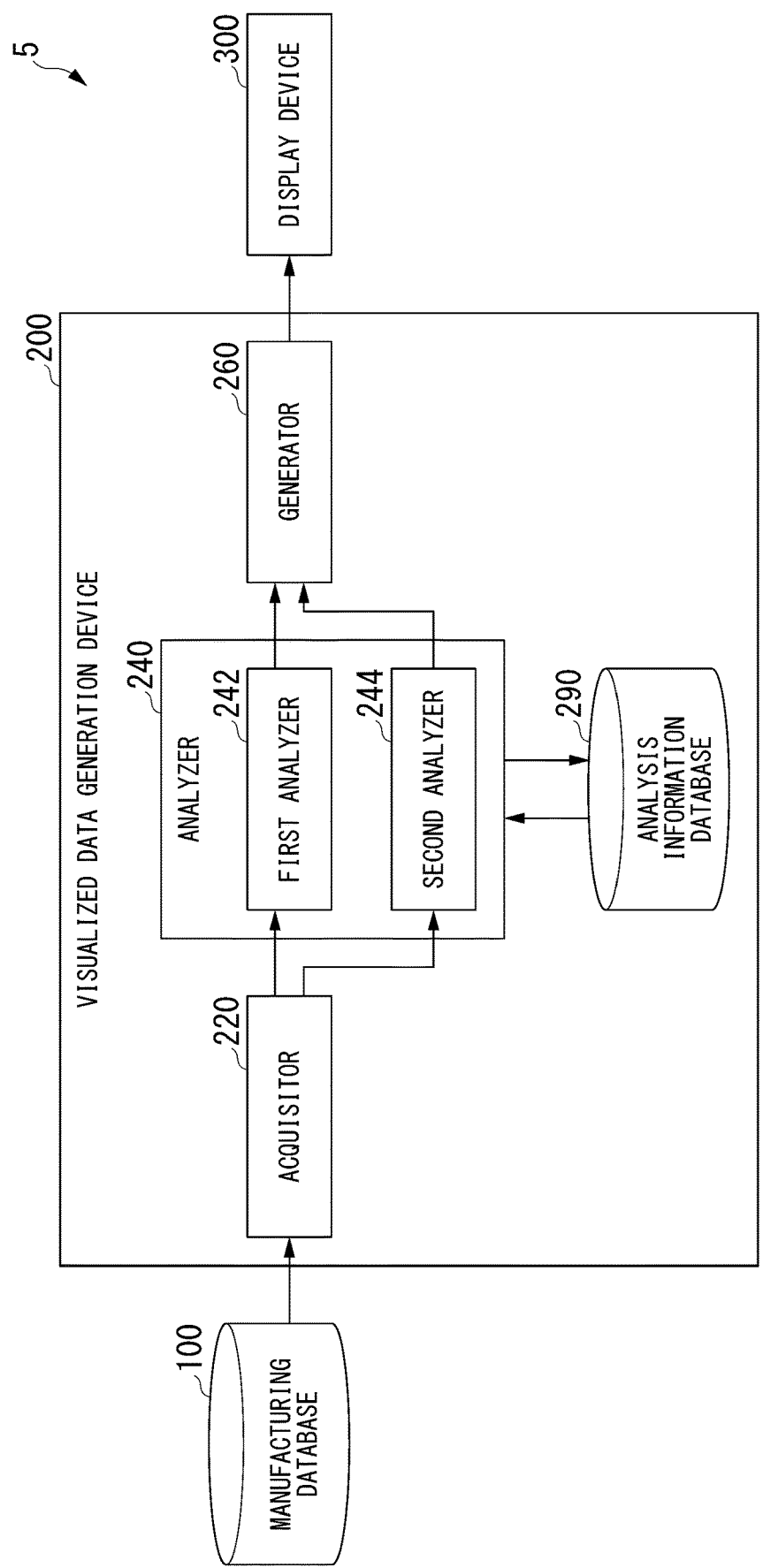
FIG. 32 is a block diagram showing a functional configuration of a visualized data generation system according to a fifth embodiment.

Next, a fifth embodiment will be described. FIG. 32 is a block diagram showing a functional configuration of a visualized data generation system 5 according to the fifth embodiment. As shown in FIG. 32, the visualized data generation system 5 of the fifth embodiment includes, for example, a manufacturing database 100, a visualized data generation device 200, and a display device 300. The visualized data generation device 200 includes, for example, an acquisitor 220, an analyzer 240, a generator 260, and an analysis information database 290. Hereinafter, the visualized data generation device 200 of the fifth embodiment will be described in a state in which description of parts similar to those of the visualized data generation device 200 of the first embodiment is omitted.

The analysis information database 290 stores a first index value $F(Yi)$, first analysis information $G(Yi)$, a second index value $F(Ti, Cj)$, and second analysis information $G(Yi, Cj)$ as analysis results obtained by the analyzer 240. The analysis information database 290 also stores manufacturing data Yi and manufacturing condition data Cj acquired by the acquisitor 220. For example, a lot number, a lot ID, or the like may be pre-recorded as a number, a string, or the like representing a certain period or a unit of a certain number of products.

The analyzer 240 may also calculate the first index value $F(Yi)$ and the second index value $F(Yi, Cj)$ using records in the analysis database. For example, a difference or a ratio between the first index value $F(Yi)$ or the second index value $F(Yi, Cj)$ of the previous analysis result and the first index value $F(Yi)$ or the second index value $F(Yi, Cj)$ of the current analysis result may be used as a type of current first index value $F(Yi)$ or second index value $F(Yi, Cj)$. Alternatively, when the abnormality rate is used as one of the first index values $F(Yi)$, a difference or a ratio between abnormality rates may be newly calculated as one of the first index values $F(Yi)$. In this case, an increase or a decrease in the abnormality rate from the previous time may be used as the index value.

The analyzer 240 may also generate analysis information using records stored in the analysis information database 290. For example, a graph in which the index value changes may be generated as analysis information. Alternatively, the analysis information may be displayed in comparison with previous analysis information. The generator 260 reads data necessary for generating the visualized data from the analysis information database 290 and generates the visualized data.

Specifically, for example, a case of use for daily manufacturing data monitoring is assumed. In this case, the user monitors manufacturing data based on analysis results of daily manufacturing. Furthermore, monitoring is performed through comparison with analysis results of the previous day or the more previous day as well as manufacturing data based on analysis results of daily manufacturing. At this time, the visualized data can be provided without performing the analysis again by storing the analysis information in the analysis information database 290. Also, a difference or a ratio based on the previous data is used as the index value and therefore the visualized data using the change in an abnormality as the index value can be generated.

Also, when the manufacturing condition data Cj to be displayed as the second image 320 included in the first image 310 is determined on the basis of a correlation with the manufacturing data Yi displayed in the first image 310, the generator 260 may be configured to update a correlation between the manufacturing data Yi and the manufacturing condition data Cj on the basis of information stored in the analysis information database 290. Furthermore, when there is manufacturing condition data Cj in which an abnormality is likely to occur in a relationship between pieces of the manufacturing condition data Cj, the generator 260 may be configured to update a correlation of the manufacturing condition data Cj on the basis of the information stored in the analysis information database 290.

Figure 33:
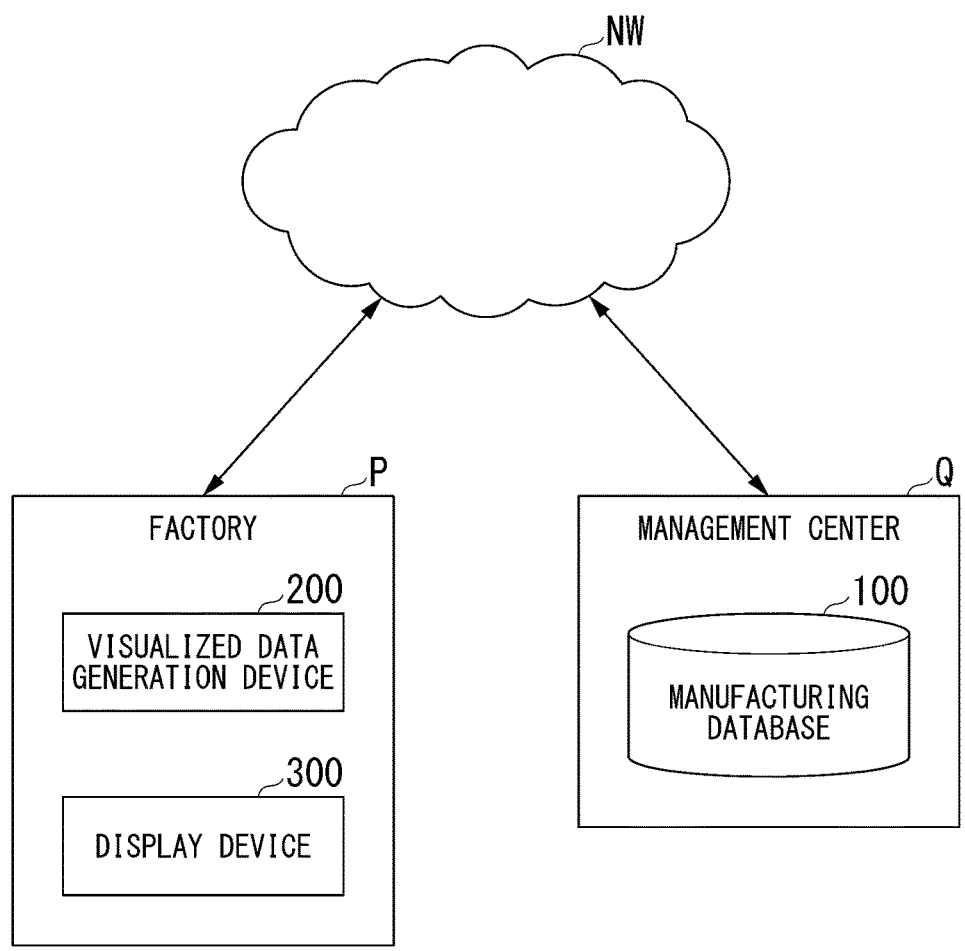
FIG. 33 is a block diagram showing a functional configuration of a visualized data generation system.

Although some embodiments and modified examples have been described above, the embodiments are not limited to the above examples. For example, although the visualized data generation system is assumed to be installed in, for example, a factory, in each of the above-described embodiments, elements of the visualized data generation system may be distributed and provided in different places. For example, as shown in FIG. 33, elements of a visualized data generation system 10 are distributed to a factory P and a management center Q and the elements of the visualized data generation system 10 may be configured to exchange information via a network NW using a transmission and reception device. Specifically, for example, the visualized data generation system 10 in which the manufacturing database is provided in the management center Q and the visualized data generation device 200 and the display device 300 are provided in the factory P may be configured.

Figure 34:
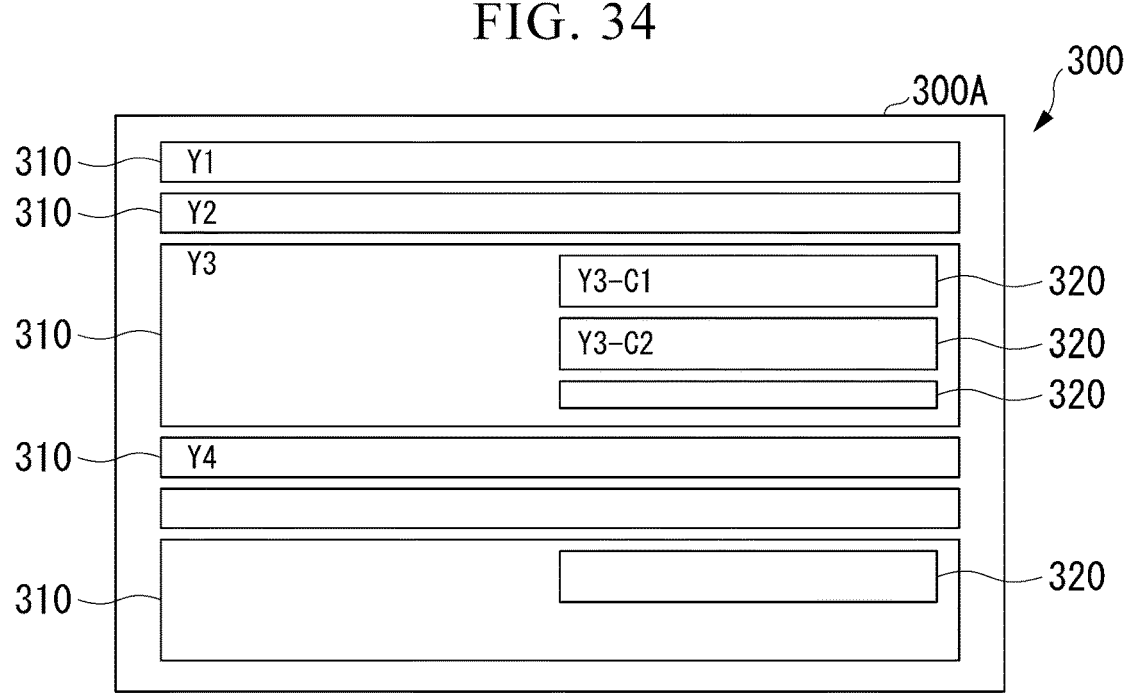
FIG. 34 is a diagram showing an example of an outline of a screen displayed on a display device.
Figure 35:
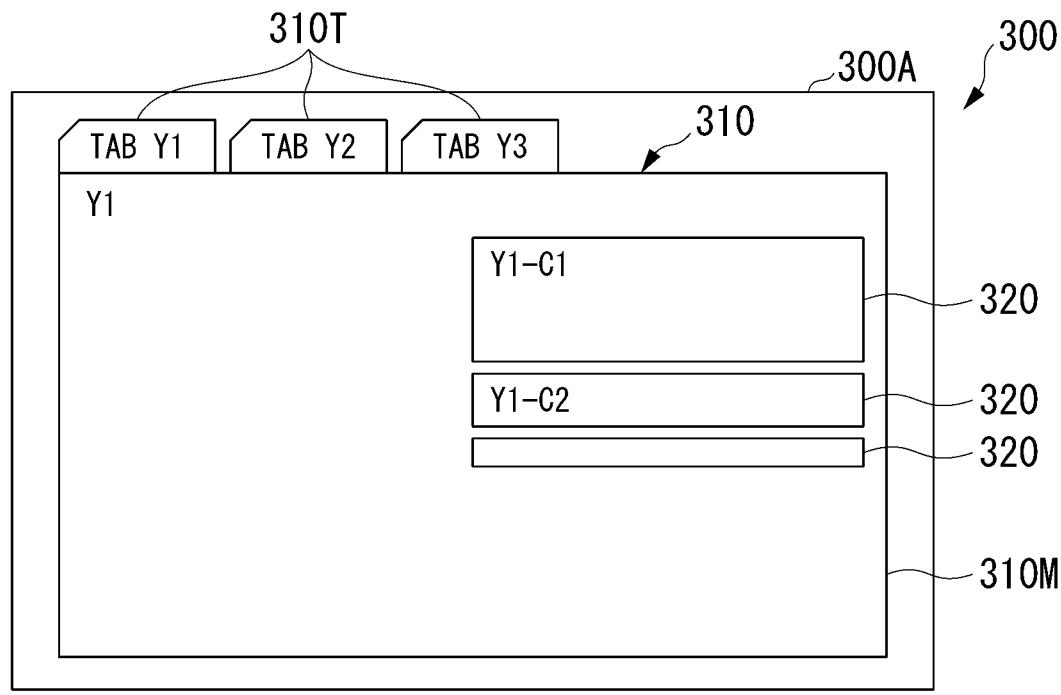
FIG. 35 is a diagram showing another example of an outline of a screen displayed on the display device.
Figure 36:
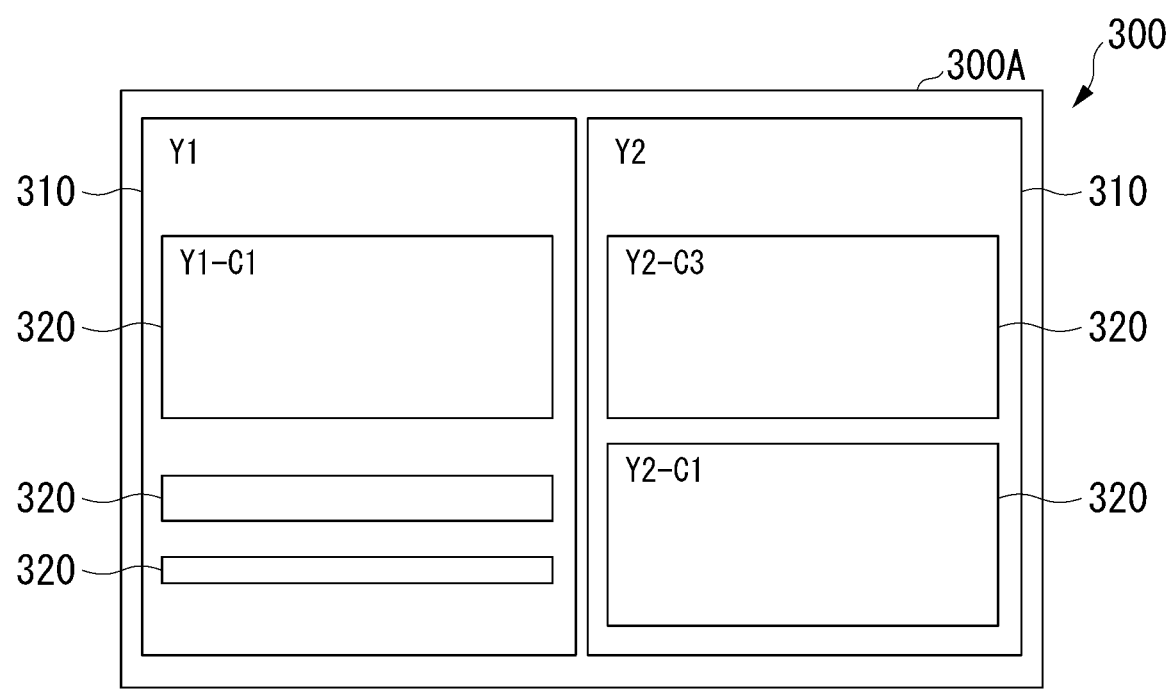
FIG. 36 is a diagram showing another example of an outline of a screen displayed on the display device.

Also, in each of the above-described embodiments, the second images 320 may be displayed in the first image 310, i.e., the first images 310 and the second images 320 are displayed in a tree structure, but may be displayed in other forms. FIGS. 34 to 36 are diagrams showing examples of an outline of a screen displayed on the display device 300. The first images 310 and the second images 320 may be displayed in a tree structure as shown in FIG. 34 or the first images 310 and the second images 320 may be displayed in a tab structure as shown in FIG. 35. Also, as shown in FIG. 36, the first images 310 and the second images 320 may be displayed in a plurality of arrangements.

As shown in FIG. 35, when the first images 310 and the second images 320 are displayed in a tab structure, the first image 310 includes a main screen 310M and a tab screen 310T, the second images 320 is displayed in the main screen 310M, and the main screen 310M of any of the plurality of first images 310 may be displayed by operating the tab screen 310T. Also, as shown in FIG. 36, when the first images 310 and the second images 320 are displayed in a plurality of arrangements, a plurality of first images 310 are arranged side by side and the second images 320 may be displayed in the plurality of first images 310.

According to at least one embodiment described above, the visualized data generation device includes the acquisitor configured to acquire first data regarding a product state; the analyzer configured to analyze the first data acquired by the acquisitor and derive a first index value of the first data; and the generator configured to determine at least one of an amount of information and a priority of the first image to be displayed on the display device with respect to the first data on the basis of the first index value and generate visualized data according to the at least one of the amount of information and the priority that has been determined, so that it is possible to avoid overlooking of an abnormality in a product and the like.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A visualized data generation device comprising:
circuitry configured to:
acquire manufacturing data including one or more pieces of first data Yi (i=1, . . . , N where N is an integer of 1 or more) regarding a product state of quality with respect to one product;
analyze the first data Yi and derive a first index value with respect to each and every piece of the first data Yi, the first index value representing the product state of quality; and
generate visualized data including at least one first analysis result display region for causing a display device to display information about the first index value in which:
at least one of an amount of information and a priority is set for each of the at least one first analysis result display region on the basis of the first index value, and
a display form of the at least one first analysis result display region or a display form of information included in the at least one first analysis result display region is set on the basis of the at least one of the amount of information and the priority,
wherein the amount of information for each of the at least one first analysis result display region is set to a larger amount when the first index value is larger and more associated with the product state of quality and a smaller amount when the first index value is smaller and less associated with the product state of quality, and
wherein the display form is set to display more detailed information in a higher order when the first index value is larger and more associated with the product state of quality and to display less detailed information in a lower order when the first index value is smaller and less associated with the product state of quality.

2. The visualized data generation device according to claim 1, wherein the circuitry is configured to:
derive first analysis data obtained by analyzing the first data Yi, and
generate visualized data for causing the display device to display information about the first analysis data when the at least one of the amount of information and the priority set on the basis of the first index value satisfies a predetermined condition.

3. The visualized data generation device according to claim 1, wherein the first index value is a value representing an abnormality level of the first data Yi.

4. The visualized data generation device according to claim 2,
wherein the first analysis data includes a plurality of items, and
wherein the circuitry is configured to select an item to be displayed in the at least one first analysis result display region from the plurality of items in accordance with the set amount of information.

5. The visualized data generation device according to claim 1, wherein the visualized data is set so that at least a part of the first data Yi is hidden on the display device.

6. The visualized data generation device according to claim 1, wherein the circuitry is configured to determine a display position of the at least one first analysis result display region in accordance with the priority of each of the at least one first analysis result display region.

7. The visualized data generation device according to claim 1, wherein the circuitry is configured to generate the visualized data for causing at least a part of the at least one first analysis result display region to be highlighted and displayed on the basis of the priority.

8. The visualized data generation device according to claim 1, wherein the circuitry is configured to generate the visualized data in which the display form of the at least one first analysis result display region or the display form of the information included in the at least one first analysis result display region is adjusted on the basis of instruction information input by a user.

9. The visualized data generation device according to claim 8, wherein the circuitry is configured to:
derive the first index value with respect to each of a plurality of pieces of the first data Yi, and
determine at least one of an amount of information and a priority of a first image to be displayed in each of the at least one first analysis result display region on the basis of a first index value selected in accordance with the user's operation from a plurality of first index values.

10. The visualized data generation device according to claim 1,
wherein the first data includes information about a type of manufacturing process of the one product with respect to each product state of quality, and
wherein the circuitry is configured to generate the visualized data in which a display position of the at least one first analysis result display region is changed when an operation of a user has been received so that display is performed in manufacturing process order.

11. The visualized data generation device according to claim 10, wherein the circuitry is configured to generate the visualized data for causing more first analysis result display regions to be displayed when the operation of the user has been received so that the display is performed in the manufacturing process order than when the at least one first analysis result display region of each piece of the first data Yi is displayed on the basis of the priority.

12. The visualized data generation device according to claim 1,
wherein the circuitry is configured to:
acquire one or more pieces of second data Cj (j=1, ..., M where M is an integer of 1 or more) regarding a product manufacturing condition with respect to one product, and
analyze the second data Cj and derives a second index value of the second data Cj,
wherein the visualized data includes at least one second analysis result display region for causing the display device to display information about the second index value, and wherein the circuitry is configured to determine the visualized data in which:
at least one of an amount of information and a priority is set for each of the at least one second analysis result display region on the basis of the second index value, and
a display form of the at least one second analysis result display region or a display form of information included in the at least one second analysis result display region is set on the basis of the at least one of the amount of information and the priority to be displayed on each of the at least one second analysis result display region.

13. The visualized data generation device according to claim 12, wherein the second index value is a value representing an abnormality level in a combination of the first data Yi and the second data Cj.

14. The visualized data generation device according to claim 12, wherein the second index value is a value representing a possibility that the product manufacturing condition will be a cause of an abnormality in the product state of quality.

15. A visualized data generation system comprising:
a visualized data generation device including
circuitry configured to
acquire manufacturing data including one or more pieces of first data Yi (i=1, ..., N where N is an integer of 1 or more) regarding a product state of quality with respect to one product;
analyze the first data Yi and derive a first index value with respect to each and every piece of the first data Yi, the first index value representing the product state of quality; and
generate visualized data including at least one first analysis result display region for causing a display device to display information about the first index value in which:
at least one of an amount of information and a priority is set for each of the at least one first analysis result display region on the basis of the first index value, and
a display form of the at least one first analysis result display region or a display form of information included in the at least one first analysis result display region is set on the basis of the at least one of the amount of information and the priority; and
a display device configured to display an image based on the generated visualized data,
wherein the amount of information for each of the at least one first analysis result display region is set to a larger amount when the first index value is larger and more associated with the product state of quality and a smaller amount when the first index value is smaller, and less associated with the product state of quality, and
wherein the display form is set to display more detailed information in a higher order when the first index value is larger and more associated with the product state of quality and to display less detailed information in a lower order when the first index value is smaller and less associated with the product state of quality.

16. The visualized data generation system according to claim 15,
wherein the circuitry is configured to:
acquire one or more pieces of second data $C_j$ ($j=1, \ldots, M$ where M is an integer of 1 or more) regarding a product manufacturing condition with respect to one product,
analyze the second data $C_j$ and derive a second index value of the second data $C_j$,
wherein the visualized data includes at least one second analysis result display region for causing the display device to display information about the second index value, and
wherein the circuitry is configured to determine the visualized data in which:
at least one of an amount of information and a priority is set for each of the at least one second analysis result display region on the basis of the second index value, and
a display form of the at least one second analysis result display region or a display form of information included in the at least one second analysis result display region is set on the basis of the at least one of the amount of information and the priority to be displayed on each of the at least one second analysis result display region.

17. A visualized data generation method comprising:
acquiring manufacturing data including one or more pieces of first data $Y_i$ ($i=1, \ldots, N$ where N is an integer of 1 or more) regarding a product state of quality with respect to one product;
analyzing the acquired first data $Y_i$ and deriving a first index value with respect to each and every piece of the first data $Y_i$, the first index value representing the product state of quality; and
generating visualized data including at least one first analysis result display region for causing a display device to display information about the first index value in which:
at least one of an amount of information and a priority is set for each of the at least one first analysis result display region on the basis of the first index value, and
a display form of the at least one first analysis result display region or a display form of information included in the at least one first analysis result display region is set on the basis of the at least one of the amount of information and the priority,
wherein the amount of information for each of the at least one first analysis result display region is set to a larger amount when the first index value is larger and more associated with the product state of quality and a smaller amount when the first index value is smaller, and less associated with the product state of quality, and
wherein the display form is set to display more detailed information in a higher order when the first index value is larger and more associated with the product state of quality and to display less detailed information in a lower order when the first index value is smaller and less associated with the product state of quality.

18. The visualized data generation method according to claim 17, further comprising:
when the manufacturing data is acquired, acquiring one or more pieces of second data $C_j$ ($j=1, \ldots, M$ where M is an integer of 1 or more) regarding a product manufacturing condition with respect to one product, and
when the first index value is derived, analyzing the second data $C_j$ and deriving a second index value of the second data $C_j$,
wherein the visualized data includes at least one second analysis result display region for causing the display device to display information about the second index value, and
wherein, when the visualized data is generated, the visualized data is determined such that:
at least one of an amount of information and a priority is set for each of the at least one second analysis result display region on the basis of the second index value, and
a display form of the at least one second analysis result display region or a display form of information included in the at least one second analysis result display region is set on the basis of the at least one of the amount of information and the priority to be displayed on each of the at least one second analysis result display region.

* * * * *